(12) United States Patent
Hirata

(10) Patent No.: US 9,529,285 B2
(45) Date of Patent: Dec. 27, 2016

(54) POLYCARBONATE COPOLYMER, AND COATING LIQUID AND ELECTROPHOTOGRAPHIC PHOTOSENSITIVE BODY USING SAME

(71) Applicant: IDEMITSU KOSAN CO., LTD., Tokyo (JP)

(72) Inventor: Kengo Hirata, Sodegaura (JP)

(73) Assignee: IDEMITSU KOSAN CO., LTD., Toyko (JP)

( * ) Notice: Subject to any disclaimer, the term of this patent is extended or adjusted under 35 U.S.C. 154(b) by 183 days.

(21) Appl. No.: 14/369,570

(22) PCT Filed: Dec. 26, 2012

(86) PCT No.: PCT/JP2012/083689
§ 371 (c)(1),
(2) Date: Jun. 27, 2014

(87) PCT Pub. No.: WO2013/099965
PCT Pub. Date: Jul. 4, 2013

(65) Prior Publication Data
US 2014/0363760 A1 Dec. 11, 2014

(30) Foreign Application Priority Data
Dec. 27, 2011 (JP) .................... 2011-286708

(51) Int. Cl.
| | | |
|---|---|---|
| G03G 5/05 | (2006.01) | |
| C08G 63/64 | (2006.01) | |
| G03G 5/07 | (2006.01) | |
| C09D 177/10 | (2006.01) | |
| C09D 177/12 | (2006.01) | |
| C08G 69/32 | (2006.01) | |
| C08G 69/44 | (2006.01) | |
| C08G 64/12 | (2006.01) | |
| C09D 169/00 | (2006.01) | |

(52) U.S. Cl.
CPC .............. *G03G 5/075* (2013.01); *C08G 63/64* (2013.01); *C08G 64/12* (2013.01); *C08G 69/32* (2013.01); *C08G 69/44* (2013.01); *C09D 169/005* (2013.01); *C09D 177/10* (2013.01); *C09D 177/12* (2013.01); *G03G 5/0564* (2013.01)

(58) Field of Classification Search
CPC .... G03G 5/0564; G03G 5/056; G03G 5/0571; G03G 5/0575; C08G 64/12; C08G 69/32; C08G 63/64
USPC .................... 430/59.6, 96; 528/185, 183, 194
See application file for complete search history.

(56) References Cited

U.S. PATENT DOCUMENTS

2011/0287354 A1* 11/2011 Hirata .................... C08G 64/12
430/72

FOREIGN PATENT DOCUMENTS

| EP | 2 378 363 A1 | 10/2011 |
|---|---|---|
| JP | 4-41524 A | 2/1992 |
| JP | 4-179961 A | 6/1992 |
| JP | 8-123049 A | 5/1996 |
| JP | 2006-52274 A | 2/2006 |
| JP | 2011-12129 A | 1/2011 |
| JP | 2011-26577 A | 2/2011 |
| WO | 2010/150885 A1 | 12/2010 |

OTHER PUBLICATIONS

Extended Search Report issued Jul. 22, 2015 in European Patent Application No. 12863990.3.
U.S. Appl. No. 14/405,595, filed Dec. 4, 2014, Hirata, et al.
International Search Report for corresponding International Application No. PCT/JP2012/083689, dated Feb. 12, 2013, 1 pages.

* cited by examiner

*Primary Examiner* — Janis L Dote
(74) *Attorney, Agent, or Firm* — Oblon, McClelland, Maier & Neustadt, L.L.P.

(57) ABSTRACT

A polycarbonate copolymer, a coating liquid and an electrophotographic photosensitive body are provided. The polycarbonate copolymer has good abrasion resistance and stable solubility in an organic solvent. The copolymer comprises a repeating unit A of formula (1); a repeating unit B of formula (2); and a repeating unit C of formula (3), in which: the polycarbonate copolymer has a presence ratio represented by $Ar^1/(Ar^1+Ar^2+Ar^3)$ of from 50 to 65 mol %, a presence ratio represented by $Ar^2/(Ar^1+Ar^2+Ar^3)$ of from 25 to 45 mol %, and a presence ratio represented by $Ar^3/(Ar^1+Ar^2+Ar^3)$ of from 3 to 25 mol %:

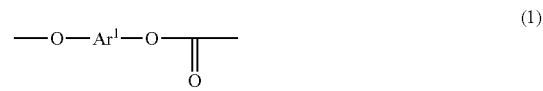

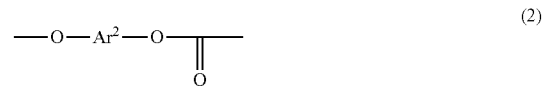

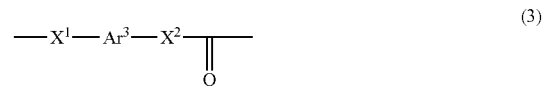

$Ar^1$, $Ar^2$, and $Ar^3$ are each independently a divalent aromatic group, and $X^1$ and $X^2$ are each independently a single bond or —NH—, provided that $Ar^1$ and $Ar^2$ are not identical to each other. In the copolymer the repeating units B are not directly bonded to each other.

20 Claims, No Drawings

POLYCARBONATE COPOLYMER, AND COATING LIQUID AND ELECTROPHOTOGRAPHIC PHOTOSENSITIVE BODY USING SAME

TECHNICAL FIELD

The present invention relates to a polycarbonate copolymer excellent in mechanical properties and solubility, and a coating liquid and an electrophotographic photosensitive body each using the copolymer.

BACKGROUND ART

A polycarbonate resin has been used as a material for molded articles in various industrial fields because the resin is excellent in mechanical properties, thermal properties, and electrical properties. In recent years, in association with expansion of application fields, performance required for the polycarbonate resin has also become diversified. It may be unable to sufficiently meet such requirement by only using a conventional polycarbonate resin, for example, 2,2-bis(4-hydroxyphenyl)propane (bisphenol A) or 1,1-bis(4-hydroxyphenyl)cyclohexane (bisphenol Z) as a raw material. Therefore, in order to meet such requirement, polycarbonate resins having various chemical structures have been proposed depending on the applications and required characteristics.

An example of such functional products is an electrophotographic photosensitive body using a polycarbonate resin as a binder resin for a functional material such as a charge generation material or a charge transport material.

The electrophotographic photosensitive body is required to have predetermined sensitivity, predetermined electrical characteristics, or predetermined optical characteristics in accordance with an electrophotographic process to which the electrophotographic photosensitive body is applied. Operations such as corona charging, toner development, transfer onto paper, and cleaning treatment are repeatedly conducted on a surface of a photosensitive layer of the electrophotographic photosensitive body, and hence electrical and mechanical external forces are applied to the surface every time these operations are conducted. Therefore, the photosensitive layer provided for the surface of the electrophotographic photosensitive body is required to have durability against those external forces in order that quality of electrophotographic images may be maintained over a long time period. In addition, the electrophotographic photosensitive body is ordinarily produced by a method involving dissolving a binder resin in an organic solvent together with a functional material and casting the solution on a conductive substrate or the like to form a film. Accordingly, solubility in, and stability against, the organic solvent are required.

The polycarbonate resin using, for example, bisphenol A or bisphenol Z as a raw material has not been sufficiently satisfactory in terms of durability when used as a binder resin for an electrophotographic photosensitive body. In view of the foregoing, various approaches have been adopted to meet such requirement. A polycarbonate copolymer is known as an effective technology for improving wear resistance of a photosensitive layer.

As an example, Patent Document 1 discloses a polycarbonate copolymer having a bisphenol Z skeleton and a biphenyl skeleton as a binder resin excellent in abrasion resistance. However, an additional improvement in abrasion resistance has been required in association with an improvement in performance of a copying machine in recent years.

Accordingly, a polycarbonate copolymer obtained by using a raw material in which a repeating number of monomer unit in the polycarbonate oligomer is reduced and improving a copolymerization ratio of a skeleton contributing to abrasion resistance has been developed and disclosed in Patent Document 2.

Meanwhile, Patent Document 3 discloses a urethane bond-containing polycarbonate composed of a polycarbonate oligomer and an aromatic diamine as a technology for improving electrical characteristics of an electrophotographic photosensitive body with a structure except a polycarbonate copolymer.

In addition, Patent Document 4 discloses a polyester polycarbonate having: a polycarbonate unit derived from a dihydric phenol having a specific structure; and a polyester unit derived from a dicarboxylic acid having a specific structure.

However, each of the polycarbonates disclosed in those documents has insufficient abrasion resistance, or has a problem in terms of, for example, electrical characteristics or stability of a coating liquid.

CITATION LIST

Patent Document

[Patent Document 1] JP 4-179961 A
[Patent Document 2] WO 2010/150885 A1
[Patent Document 3] JP 2011-12129 A
[Patent Document 4] JP 8-123049 A

SUMMARY OF INVENTION

Technical Problem

The present invention has been made on the basis of the circumstances, and an object of the present invention is to provide a polycarbonate copolymer improved in abrasion resistance while maintaining its stable solubility in an organic solvent, and a coating liquid and an electrophotographic photosensitive body each obtained by using the copolymer.

Solution to Problem

As a result of their extensive studies, the inventors of the present invention have found that the problems can be solved by using a copolymer having a carbonate skeleton contributing to abrasion resistance and solubility, a carbonate skeleton except the skeleton, and a skeleton having a third bonding group except a carbonate bond, and have completed the present invention.

That is, the present invention provides the following.

1. A polycarbonate copolymer, comprising: a repeating unit A represented by the following general formula (1); a repeating unit B represented by the following general formula (2); and a repeating unit C represented by the following general formula (3), in which: the polycarbonate copolymer has a presence ratio represented by $Ar^1/(Ar^1+Ar^2+Ar^3)$ of from 50 to 65 mol %, a presence ratio represented by $Ar^2/(Ar^1+Ar^2+Ar^3)$ of from 25 to 45 mol %, and a presence ratio represented by $Ar^3/(Ar^1+Ar^2+Ar^3)$ of from 3 to 25 mol %; and the repeating units B are not directly bonded to each other:

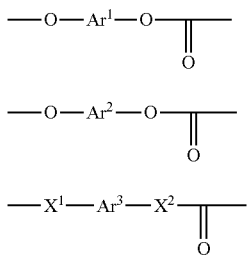

(1)

(2)

(3)

in the formulae, $Ar^1$, $Ar^2$, and $Ar^3$ each independently represent a divalent aromatic group, and $X^1$ and $X^2$ each independently represent a single bond or —NH—, provided that $Ar^1$ and $Ar^2$ are not identical to each other.

2. The polycarbonate copolymer according to the item 1, in which $Ar^1$ is represented by the following general formula (4):

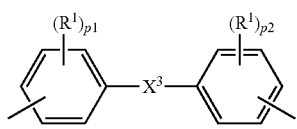

(4)

in the formula:

$R^1$ and $R^2$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted;

p1 and p2 each independently represent an integer of from 0 to 4, when p1 represents an integer of 2 or more, a plurality of $R^1$ may be identical to or different from each other, and when p2 represents an integer of 2 or more, a plurality of $R^2$ may be identical to or different from each other;

$X^3$ represents a single bond, —O—, —CO—, —S—, —SO—, —SO$_2$—, —CR$^3$R$^4$—, a cycloalkylidene group having 5 to 20 carbon atoms that may be substituted, a bicyclo- or tricyclo-hydrocarbon-diyl group having 5 to 20 carbon atoms that may be substituted, an α,ω-alkylene group having 2 to 12 carbon atoms that may be substituted, a 9,9-fluorenylidene group that may be substituted, a 1,8-menthanediyl group that may be substituted, a 2,8-menthanediyl group that may be substituted, an arylene group having 6 to 12 ring-forming carbon atoms that may be substituted, anyone of divalent groups represented by the following formulae (5), or an alkylidene-arylene-alkylidene group having 8 to 16 carbon atoms represented by the following formula (6); and $R^3$ and $R^4$ each independently represent a hydrogen atom, an alkyl group having 1 to 12 carbon atoms, a haloalkyl group having 1 to 12 carbon atoms, or an aryl group having 6 to 12 ring-forming carbon atoms that may be substituted:

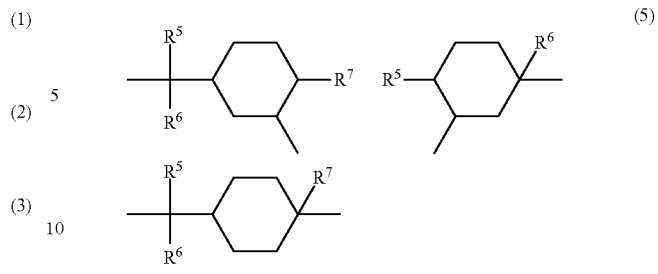

(5)

in the formulae, $R^5$ to $R^7$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted;

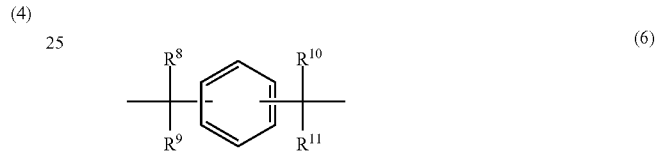

(6)

in the formula, $R^8$ to $R^{11}$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted.

3. The polycarbonate copolymer according to the item 1 or 2, in which $Ar^2$ and $Ar^3$ each independently represent a naphthylene group that may be substituted or a divalent group represented by the following general formula (7):

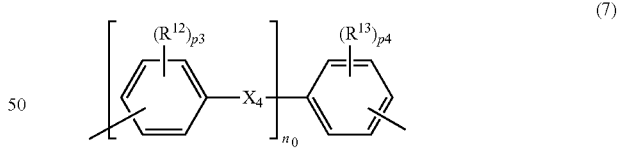

(7)

in the formula:

$X_4$ represents a single bond, —O—, —CO—, —S—, —SO—, —SO$_2$—, —CONH—, —CR$^6$R$^7$—, —O—R$^8$—O—, a cycloalkylidene group having 5 to 20 carbon atoms that may be substituted, a bicyclo- or tricyclo-hydrocarbon-diyl group having 5 to 20 carbon atoms that may be substituted, an α,ω-alkylene group having 2 to 12 carbon atoms that may be substituted, a 9,9-fluorenylidene group that may be substituted, a 1,8-menthanediyl group that may be substituted, a 2,8-menthanediyl group that may be substituted, a pyrazylidene group that may be substituted, an arylene group having 6 to 12 ring-forming carbon atoms that may be substituted, anyone of divalent groups represented by the following formulae (5), or an alkylidene-arylenealkylidene group having 8 to 16 carbon atoms represented by the following formula (6);

$R^6$ and $R^7$ each independently represent a hydrogen atom, an alkyl group having 1 to 12 carbon atoms, a haloalkyl group having 1 to 12 carbon atoms, or an aryl group having 6 to 12 ring-forming carbon atoms that may be substituted;

$R^8$ represents a carbonyl group, an alkylene group having 1 to 6 carbon atoms, a haloalkylene group having 1 to 6 carbon atoms, an arylene group having 6 to 12 ring-forming carbon atoms, or a combination thereof;

$R^{12}$ and $R^{13}$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted;

p3 and p4 each independently represent an integer of from 0 to 4, when p3 represents an integer of 2 or more, a plurality of $R^{12}$ may be identical to or different from each other, and when p4 represents an integer of 2 or more, a plurality of $R^{13}$ may be identical to or different from each other; and $n_0$ represents an integer of from 0 to 2, and when $n_0$ represents 2, a plurality of $R^{12}$ may be identical to or different from each other, a plurality of p3 may be identical to or different from each other, and a plurality of $X_4$ may be identical to or different from each other:

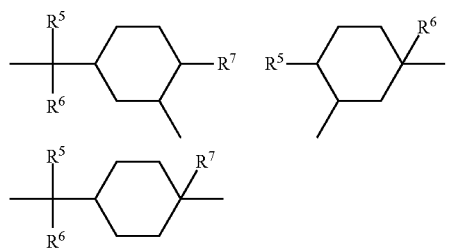

(5)

in the formulae, $R^5$ to $R^7$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted;

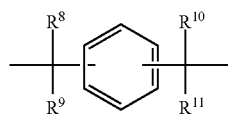

(6)

in the formula, $R^8$ to $R^{11}$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted.

4. The polycarbonate copolymer according to the item 2 or 3, in which $X^3$ in the formula (4) represents —$CR^3R^4$—, a cycloalkylidene group having 5 to 20 carbon atoms that may be substituted, or a bicyclo- or tricyclo-hydrocarbon-diyl group having 5 to 20 carbon atoms that may be substituted, and $R^3$ and $R^4$ each independently represent a hydrogen atom or an alkyl group having 1 to 12 carbon atoms.

5. The polycarbonate copolymer according to any one of the items 1 to 4, in which $Ar^1$ is represented by any one of the following formulae.

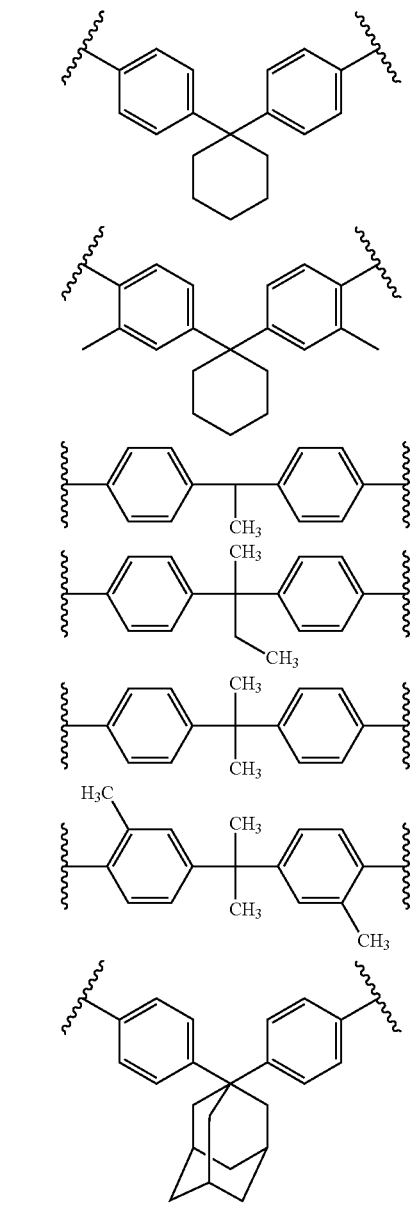

6. A method of producing the polycarbonate copolymer according to any one of the items 1 to 5, comprising causing a bischloroformate oligomer represented by the following formula (I), a dihydric phenol compound represented by the following formula (II), a diamine compound represented by the following formula (III-1) and/or an acid chloride represented by the following formula (III-2), and an acid-binding agent to react with one another:

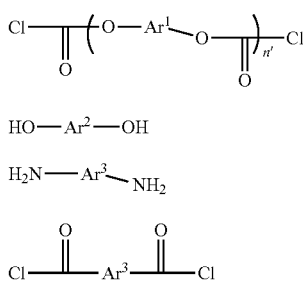

$$\text{Cl} \underset{O}{\overset{}{-}} \!\!\left(\!\text{O}-\text{Ar}^1\!-\!\text{O} \underset{O}{\overset{}{-}}\!\right)_{\!n'}\!\!\text{Cl} \quad (I)$$

$$\text{HO}-\text{Ar}^2-\text{OH} \quad (II)$$

$$\text{H}_2\text{N}-\text{Ar}^3-\text{NH}_2 \quad (III\text{-}1)$$

$$\text{Cl}\underset{O}{\overset{}{-}}\!\!-\text{Ar}^3-\underset{O}{\overset{}{-}}\!\!-\text{Cl} \quad (III\text{-}2)$$

in the formulae, $Ar^1$, $Ar^2$, and $Ar^3$ each independently represent a divalent aromatic group, and n' represents an average repeating number of monomer unit and represents from 1.0 to 1.99, provided that $Ar^1$ and $Ar^2$ are not identical to each other.

7. The method of producing a polycarbonate copolymer according to the item 6, in which a first step of bringing the bischloroformate oligomer, and the diamine compound and/or the acid chloride into contact with each other, and a second step of causing a reaction product of the first step to react with the dihydric phenol are performed in order.

8. The method of producing a polycarbonate copolymer according to the item 6 or 7, in which a base amount of the acid-binding agent is from 1.1 to 3.0 molar equivalents per mol of the bischloroformate oligomer.

9. The method of producing a polycarbonate copolymer according to any one of the items 6 to 8, further comprising using a chain-end terminator.

10. A coating liquid, comprising: the polycarbonate copolymer according to any one of the items 1 to 5; and an organic solvent.

11. An electrophotographic photosensitive body, comprising: a conductive substrate; and a photosensitive layer formed on the conductive substrate, in which the photosensitive layer contains the polycarbonate copolymer according to any one of the items 1 to 5 as one component thereof.

Advantageous Effects of Invention

According to the present invention, the polycarbonate copolymer remarkably improved in abrasion resistance while maintaining its stable solubility in an organic solvent, and the coating liquid and the electrophotographic photosensitive body each obtained by using the copolymer are provided.

DESCRIPTION OF EMBODIMENTS

Hereinafter, a polycarbonate copolymer (hereinafter sometimes simply referred to as "PC copolymer") of the present invention, and a coating liquid and an electrophotographic photosensitive body each using the PC copolymer are described in detail.

It should be noted that the phrase "a to b carbon atoms" in the expression "X group having a to b carbon atoms that may be substituted" as used herein represents the number of carbon atoms when the X group is unsubstituted, and the number of carbon atoms of a substituent when the X group is substituted is not included.

[Structure of PC Copolymer]

The PC copolymer of the present invention comprises: a repeating unit A represented by the following general formula (1); a repeating unit B represented by the following general formula (2); and a repeating unit C represented by the following general formula (3), in which: the PC copolymer has a presence ratio represented by $Ar^1/(Ar^1+Ar^2+Ar^3)$ of from 50 to 65 mol %, a presence ratio represented by $Ar^2/(Ar^1+Ar^2+Ar^3)$ of from 25 to 45 mol %, and a presence ratio represented by $Ar^3/(Ar^1+Ar^2+Ar^3)$ of from 5 to 25 mol %; and the repeating units B are not directly bonded to each other.

The PC copolymer of the present invention is a PC copolymer in which a direct bond between the repeating units B is not observed by $^{13}$C-NMR analysis, and is preferably a PC copolymer in which a direct bond between the repeating units C is also not observed by $^{13}$C-NMR analysis.

Herein, a state where the direct bond between the repeating units B or the direct bond between the repeating units C is not observed by $^{13}$C-NMR analysis means that the direct bond between the repeating units B or the direct bond between the repeating units C is not observed when measurement is performed with a 400-MHz $^{13}$C-NMR apparatus under the condition of a cumulative number of 12,000 times.

The PC copolymer of the present invention has stable solubility in an organic solvent and excellent abrasion resistance. The repeating unit A constituting the PC copolymer having such characteristics preferably contributes to both the solubility and the abrasion resistance, and the repeating unit B preferably contributes to the abrasion resistance. The repeating unit C contributes to the improvement of the abrasion resistance.

In the case where the repeating unit B is a group contributing to the improvement of the abrasion resistance, when the repeating units B are directly bonded to each other to constitute a unit that is a dimer or more, the solubility in an organic solvent reduces. Accordingly, the PC copolymer needs to be such that the direct bond between the repeating units B is not observed.

Basically, $X^1$ and $X^2$ constituting the repeating unit C both represent single bonds or both represent —NH—. The presence of any such bond improves a strength such as the abrasion resistance or an elastic modulus.

When $X^1$ and $X^2$ each represent a single bond, the repeating unit C has a rigid bond resulting from an ester bond, and the mechanical strength, electrical durability, or chemical durability such as solvent resistance of the copolymer improves. In addition, when the repeating units C are directly bonded to each other to constitute a repeating unit that is a dimer or more, the solubility in an organic solvent may reduce. Accordingly, the PC copolymer is preferably such that the direct bond between the repeating units C is not observed.

When $X^1$ and $X^2$ each represent —NH—, a hydrogen bond between molecules contributes to the improvement of the abrasion resistance. When the repeating units C are directly bonded to each other to constitute a repeating unit that is a dimer or more, the solubility in an organic solvent may reduce owing to an excessive amount of hydrogen bonds. Accordingly, the PC copolymer is preferably such that the direct bond between the repeating units C is not observed.

The PC copolymer of such preferred structure can be produced by, for example, a method to be described later.

$$-\text{O}-\text{Ar}^1-\text{O}-\underset{O}{\overset{}{\|}}- \quad (1)$$

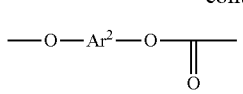

(2)

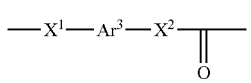

(3)

(In the formulae, $Ar^1$, $Ar^2$, and $Ar^3$ each independently represent a divalent aromatic group, and $X^1$ and $X^2$ each independently represent a single bond or —NH—, provided that $Ar^1$ and $Ar^2$ are not identical to each other.)

Herein, the aromatic group refers to an organic group having an aromatic ring and also incorporates a group containing a heteroatom.

The PC copolymer of the present invention has various performances as a result of balanced copolymerization of repeating units including $Ar^2$ and $Ar^3$ having properties different from those of $Ar^1$ having a high presence ratio.

In the present invention, an average repeating number n to be described later in the repeating unit A is preferably from 1.0 to 3.0. In addition, the repeating unit A preferably contributes to both the solubility and the abrasion resistance, and the repeating unit B preferably contributes to the abrasion resistance. The case where $Ar^1$ and $Ar^2$ are identical to each other is not preferred because the possibility that the average repeating number n calculated by a method to be described later exceeds 3.0 increases owing to a direct bond between the repeating units A and B, and hence the solubility in an organic solvent may reduce. On the other hand, in the case where $Ar^1$ and $Ar^2$ are selected while importance is placed on the solubility, the solubility in an organic solvent may not reduce even when the average repeating number n exceeds 3.0. However, the improvement of the abrasion resistance cannot be expected.

n does not become a number of less than 1.0 because the PC copolymer of the present invention is ordinarily produced by causing a monomer containing the repeating unit A (generally a bischloroformate oligomer having a low monomer number to be described later) to react with monomers containing $Ar^2$ and $Ar^3$. Meanwhile, when n is 3.0 or less, the chain of the repeating units A shortens. As a result, the crystallization of the copolymer occurs because of the chain of the repeating units A and the possibility in which the coating liquid becomes turbidity reduces. In addition, the ratio of the repeating unit B contributing to the abrasion resistance increases, and the ratio of a third bonding group (bond except a carbonate bond) with the introduction of the repeating unit C increases, so the improvement of the abrasion resistance is expected. n is preferably 1.0 or more and 3.0 or less from the viewpoint of the stability of the coating liquid or the abrasion resistance of the copolymer.

The average repeating unit number n of the repeating unit A in the PC copolymer of the present invention is calculated by a method described in Examples to be described later.

In the PC copolymer of the present invention, the presence ratio of $Ar^1$ represented by $Ar^1/(Ar^1+Ar^2+Ar^3)$ needs to be from 50 to 65 mol %, and is preferably from 52 to 65 mol %, more preferably from 55 to 60 mol %. When the PC copolymer is used as a binder resin for an electrophotographic photosensitive body, a presence ratio of $Ar^1$ in excess of 65 mol % is not preferred in terms of durability because the presence ratios of $Ar^2$ and $Ar^3$ contributing to the abrasion resistance of the PC copolymer reduce. In addition, when the presence ratio of $Ar^1$ is less than 50 mol %, the presence ratios of $Ar^2$ and $Ar^3$ in the polymer increase, so the solubility in an organic solvent is reduced. In addition, reducing only the ratio of the $Ar^3$ component reduces the abrasion resistance instead.

In addition, the presence ratio of $Ar^2$ represented by $Ar^2/(Ar^1+Ar^2+Ar^3)$ is from 25 to 45 mol %, preferably from 30 to 45 mol %. When the presence ratio of $Ar^2$ is less than 25 mol %, the abrasion resistance reduces. When the ratio exceeds 45 mol %, the solubility in an organic solvent is reduced.

In addition, the presence ratio of $Ar^3$ represented by $Ar^3/(Ar^1+Ar^2+Ar^3)$ is from 3 to 25 mol %, preferably from 5 to 20 mol %, more preferably from 5 to 15 mol %. When the presence ratio of $Ar^3$ is less than 3 mol %, the effect of the invention of the present application is not sufficiently obtained. When the ratio exceeds 25 mol %, a characteristic of a bonding group except a carbonate group or an interaction between molecular chains is not properly suppressed, and hence the coating liquid becomes turbid. In addition, the production stability of the PC copolymer deteriorates. A presence ratio of $Ar^3$ described above of 25 mol % or less is preferred particularly when $X^1$ and/or $X^2$ each represent/represents a single bond because the occurrence of the turbidity in the production of the copolymer resulting from a rigid structure is suppressed. A presence ratio of $Ar^3$ described above of 25 mol % or less is preferred when $X^1$ and/or $X^2$ each represent/represents —NH— because the solidification of the polymer in the production of the copolymer resulting from an intermolecular hydrogen bond is suppressed. The ratio of the repeating unit C is suitably minimized to the extent that the abrasion resistance improves in terms of the production stability of the PC copolymer.

In addition, the reduced viscosity [$\eta_{SP}$/C] at 20° C. of a solution of the PC-copolymer of the present invention in methyl chloride having a concentration of 0.5 g/dl, is preferably from 0.5 to 4 dl/g, more preferably from 0.8 to 3.0 dl/g, particularly preferably from 0.9 to 2.0 dl/g. In the case where the reduced viscosity [$\eta_{SP}$/C] is 0.5 dl/g or more, the abrasion resistance and durability of the copolymer when used as an electrophotographic photosensitive body become sufficient. In addition, in the case where the reduced viscosity [$\eta_{SP}$/C] is 4 dl/g or less, when a molded body such as an electrophotographic photosensitive body is produced from the coating liquid, the viscosity of the coating liquid sufficiently reduces and hence the productivity of the molded body such as an electrophotographic photosensitive body improves.

$Ar^1$ in the general formula (1) is preferably represented by the following formula (4) from the viewpoints of, for example, the abrasion resistance and the solubility in an organic solvent.

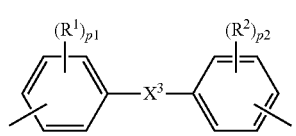

(4)

(In the formula: $R^1$ and $R^2$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted.

p1 and p2 each independently represent an integer of from 0 to 4, preferably an integer of from 0 to 2. When p1 and p2 represents 5 or more, an interaction between the molecules of the PC copolymer reduces owing to steric hindrance, with the result that the abrasion resistance may reduce.

When p1 represents an integer of 2 or more, a plurality of $R^1$ may be identical to or different from each other. When p2 represents an integer of 2 or more, a plurality of $R^2$ may be identical to or different from each other.

Examples of the halogen atom represented by $R^1$ and $R^2$ include a fluorine atom, a chlorine atom, a bromine atom, and an iodine atom.

Examples of the alkyl group having 1 to 12 carbon atoms represented by $R^1$ and $R^2$ include linear, branched, and cyclic alkyl groups. Examples thereof include a methyl group, an ethyl group, an n-propyl group, an isopropyl group, an n-butyl group, a t-butyl group, an n-hexyl group, and a cyclohexyl group. Among them, an alkyl group having 1 to 6 carbon atoms is preferred from the viewpoint of the solubility.

Examples of the haloalkyl group having 1 to 12 carbon atoms represented by $R^1$ and $R^2$ include groups each obtained by combining the halogen element and the alkyl group. Among them, a haloalkyl group having 1 to 6 carbon atoms is preferred from the viewpoint of the solubility.

The aryl group having 6 to 12 ring-forming carbon atoms that may be substituted, represented by $R^1$ and $R^2$ is, for example, a phenyl group. It should be noted that examples of the substituent in the expression "may be substituted" as used herein include an alkyl group having 1 to 12 carbon atoms (preferably 1 to 4 carbon atoms), a haloalkyl group having 1 to 12 carbon atoms (preferably 1 to 4 carbon atoms), a halogen atom such as a fluorine atom, a chlorine atom, a bromine atom, or an iodine atom, and a phenyl group. Examples of the alkyl group include the same groups as those exemplified in the alkyl group having 1 to 12 carbon atoms represented by $R^1$ and $R^2$, and preferred examples thereof are also the same. The halogen atom is preferably a fluorine atom or a chlorine atom.

An alkyl group having 1 to 12 carbon atoms constituting the alkoxy group having 1 to 12 carbon atoms that may be substituted represented by $R^1$ and $R^2$ is exemplified by the same groups as those exemplified in the alkyl group having 1 to 12 carbon atoms represented by $R^1$ and $R^2$, and preferred examples thereof are also the same.

An aryl group having 6 to 12 ring-forming carbon atoms constituting the aryloxy group having 6 to 12 ring-forming carbon atoms that may be substituted, represented by $R^1$ and $R^2$ is, for example, a phenyl group.

Examples of the arylalkyl group having 7 to 20 carbon atoms that may be substituted, represented by $R^1$ and $R^2$ include groups obtained by combining groups exemplified in the alkyl group having 1 to 12 carbon atoms and aryl group having 6 to 12 ring-forming carbon atoms each represented by $R^1$ and $R^2$.

$X^3$ represents a single bond, —O—, —CO—, —S—, —SO—, —SO$_2$—, —CR$^3$R$^4$—, a cycloalkylidene group having 5 to 20 carbon atoms that may be substituted, a bicyclo- or tricyclo-hydrocarbon-diyl group having 5 to 20 carbon atoms that may be substituted, an α,ω-alkylene group having 2 to 12 carbon atoms that may be substituted, a 9,9-fluorenylidene group that may be substituted, a 1,8-menthanediyl group that may be substituted, a 2,8-menthanediyl group that may be substituted, an arylene group having 6 to 12 ring-forming carbon atoms that may be substituted, any one of the divalent groups represented by the following formulae (5), or an alkylidene-arylene-alkylidene group having 8 to 16 carbon atoms represented by the following formula (6). From the viewpoint of placing importance on the solubility, $X^3$ preferably represents —CR$^3$R$^4$—, a cycloalkylidene group having 5 to 20 carbon atoms that may be substituted, a bicyclo- or tricyclo-hydrocarbon-diyl group having 5 to 20 carbon atoms that may be substituted, or an α,ω-alkylene group having 2 to 12 carbon atoms that may be substituted. Meanwhile, from the viewpoint of placing importance on the abrasion resistance, $X^3$ preferably represents a single bond or —O—.

$R^3$ and $R^4$ each independently represent a hydrogen atom, an alkyl group having 1 to 12 carbon atoms, a haloalkyl group having 1 to 12 carbon atoms, or an aryl group having 6 to 12 ring-forming carbon atoms that may be substituted.)

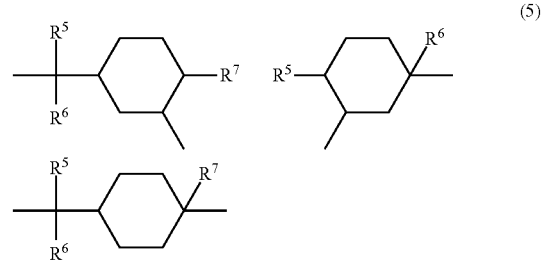

(5)

(In the formulae, $R^5$ to $R^7$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted.)

(6)

(In the formula, $R^8$ to $R^{11}$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted.)

The —CR$^3$R$^4$— represented by $X^3$ is, for example, an alkylidene group having 2 to 8 carbon atoms. Examples of such alkylidene group include an ethylidene group, a n-propylidene group, a n-butylidene group, an isobutylidene group, a n-pentylidene group, an isopentylidene group, an n-octylidene group, and an isooctylidene group. When $R^3$ and/or $R^4$ represent an alkyl group having 1 to 12 carbon atoms, examples thereof include the same groups as those exemplified in the alkyl group having 1 to 12 carbon atoms represented by $R^1$ and $R^2$. When $R^3$ and/or $R^4$ represent a haloalkyl group having 1 to 12 carbon atoms, examples thereof include the same groups as those exemplified in the haloalkyl group having 1 to 12 carbon atoms represented by $R^1$ and $R^2$. The aryl group having 6 to 12 ring-forming carbon atoms that may be substituted is, for example, a phenyl group.

Examples of the cycloalkylidene group having 5 to 20 carbon atoms that may be substituted, represented by $X^3$, include a cyclopentylidene group, a cyclohexylidene group, a cyclooctylidene group, and a cyclodecylidene group. Among them, a cycloalkylidene group having 5 to 10 carbon atoms is preferred, a cycloalkylidene group having 5 to 8 carbon atoms is more preferred, and a cyclohexylidene group is still more preferred. The substituent is preferably an alkyl group having 1 to 12 carbon atoms and is more preferably an alkyl group having 1 to 6 carbon atoms in terms of the solubility.

Examples of the bicyclo- or tricyclo-hydrocarbon-diyl group having 5 to 20 carbon atoms that may be substituted, represented by $X^3$, include an adamantane-2,2-diyl group and an adamantane-1,3-diyl group. The substituent is preferably an alkyl group having 1 to 12 carbon atoms and is more preferably an alkyl group having 1 to 6 carbon atoms in terms of the solubility.

Examples of the α,ω-alkylene group having 2 to 12 carbon atoms that may be substituted, represented by $X^3$, include an ethylene group, a propylene group, a trimethylene group, a tetramethylene group, a pentamethylene group, and an octamethylene group. Among them, an alkylene group having 1 to 5 carbon atoms is preferred and an alkylene group having 1 to 3 carbon atoms is more preferred from the viewpoint of the solubility.

The substituent of the 9,9-fluorenylidene group that may be substituted, represented by $X^3$, is preferably an alkyl group having 1 to 6 carbon atoms in terms of the solubility.

The substituent of the 1,8-menthanediyl group or 2,8-menthanediyl group that may have be substituted, represented by $X^3$, is preferably an alkyl group having 1 to 6 carbon atoms in terms of the solubility.

The arylene group having 6 to 12 ring-forming carbon atoms that may be substituted, represented by $X^3$ is, for example, a phenylene group. The substituent is preferably an alkyl group having 1 to 6 carbon atoms in terms of the solubility.

Specific examples of $R^5$ to $R^7$ in the divalent groups represented by the formulae (5) represented by $X^3$ can include the groups described in $R^1$ and $R^2$.

Specific examples of $R^8$ to $R^{11}$ in the alkylidene-arylene-alkylidene group having 8 to 16 carbon atoms represented by the formula (6) represented by $X^3$ can include the groups described in $R^1$ and $R^2$.

In the general formulae (2) and (3), it is preferred that $Ar^2$ and $Ar^3$ each independently represent a naphthylene group that may be substituted or a divalent group represented by the following general formula (7), from the viewpoint of, for example, the abrasion resistance.

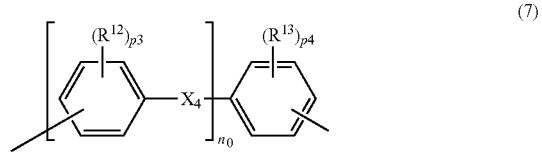

(7)

(In the formula: $X_4$ represents a single bond, —O—, —CO—, —S—, —SO—, —SO$_2$—, —CONH—, —CR$^6$R$^7$—, —O—R$^8$—O—, a cycloalkylidene group having 5 to 20 carbon atoms that may be substituted, a bicyclo- or tricyclo-hydrocarbon-diyl group having 5 to 20 carbon atoms that may be substituted, an α,ω-alkylene group having 2 to 12 carbon atoms that may be substituted, a 9,9-fluorenylidene group that may be substituted, a 1,8-menthanediyl group that may be substituted, a 2,8-menthanediyl group that may be substituted, a pyrazylidene group that may be substituted, an arylene group having 6 to 12 ring-forming carbon atoms that may be substituted, any one of divalent groups represented by the formulae (5), or an alkylidene-arylene-alkylidene group having 8 to 16 carbon atoms represented by the formula (6), preferably represents a single bond or —O—, and preferably represents a 9,9-fluorenylidene group that may be substituted in terms of the improvement of the hardness.

$R^6$ and $R^7$ each independently represent a hydrogen atom, an alkyl group having 1 to 12 carbon atoms, a haloalkyl group having 1 to 12 carbon atoms, or an aryl group having 6 to 12 ring-forming carbon atoms that may be substituted. Specific examples thereof can include the groups listed in the description of —CR$^3$CR$^4$—.

$R^8$ represents a carbonyl group, an alkylene group having 1 to 6 carbon atoms, a haloalkylene group having 1 to 6 carbon atoms, an arylene group having 6 to 12 ring-forming carbon atoms, or a combination thereof.

$R^{12}$ and $R^{13}$ each independently represent a halogen atom, an alkyl group having 1 to 12 carbon atoms, a haloalkyl group having 1 to 12 carbon atoms, an aryl group having 6 to 12 ring-forming carbon atoms that may be substituted, an alkoxy group having 1 to 12 carbon atoms that may be substituted, an aryloxy group having 6 to 12 ring-forming carbon atoms that may be substituted, or an arylalkyl group having 7 to 20 carbon atoms that may be substituted.

p3 and p4 each independently represent an integer of from 0 to 4, preferably an integer of from 0 to 2. When p3 and p4 represents 5 or more, an interaction between the molecules of the PC copolymer reduces owing to steric hindrance, with the result that the abrasion resistance may reduce.

When p3 represents an integer of 2 or more, a plurality of $R^{12}$ may be identical to or different from each other, and when p4 represents an integer of 2 or more, a plurality of $R^{13}$ may be identical to or different from each other.

$n_0$ represents an integer of from 0 to 2, and preferably represents 0 or 1 from the viewpoint of the abrasion resistance.

$n_0$ represents 2, a plurality of $R^{12}$ may be identical to or different from each other, a plurality of p3 may be identical to or different from each other, and a plurality of $X_4$ may be identical to or different from each other.)

Specific examples of $X_4$ described above include the groups listed in the description of $X^3$ in the formula (4).

Specific examples of $R^6$ and $R^7$ described above can include the groups listed in the description of the —CR$^3$CR$^4$—.

Specific examples of the alkylene group having 1 to 6 carbon atoms in $R^8$ described above include a methylene group, an ethylene group, various propylene groups, various butylene groups, various pentylene groups, and various hexylene groups. A cyclic alkylene group such as a cyclohexylene group is also permitted.

Specific examples of the haloalkylene group having 1 to 6 carbon atoms in $R^8$ described above include groups each obtained by substituting part or all of the hydrogen atoms of the alkylene with a halogen atom such as a fluorine atom.

Specific examples of the arylene group having 6 to 12 ring-forming carbon atoms in $R^8$ described above include a phenylene group, a naphthylene group, and a biphenylene group.

In the formula (7), $R^{12}$ and $R^{13}$ each preferably represent a hydrogen atom (p3 and p4 each represent 0), an alkyl group having 1 to 12 carbon atoms, or a haloalkyl group having 1 to 12 carbon atoms. The presence of any such group additionally improves the abrasion resistance of the PC copolymer of the present invention, and when the copolymer is used in an electrophotographic photosensitive body, its electrophotographic characteristics additionally improve. Specific groups in $R^{12}$ and $R^{13}$ can include the groups listed as $R^1$ and $R^2$ in the formula (4).

In addition, $X_4$ preferably represents a single bond, —O—, —S—, —SO—, —SO$_2$—, —CR$^6$R$^7$—, a cycloalkylidene group having 5 to 20 carbon atoms that may be substituted, a bicyclo- or tricyclo-hydrocarbon-diyl group having 5 to 20 carbon atoms that may be substituted, a 9,9-fluorenylidene group that may be substituted, a 1,8-menthanediyl group that may be substituted, a 2,8-menthanediyl group that may be substituted, or an arylene group having 6 to 12 ring-forming carbon atoms that may be substituted. The presence of any such group additionally improves the abrasion resistance of the PC copolymer of the present invention, and when the copolymer is used in an electrophotographic photosensitive body, its electrophotographic characteristics additionally improve.

$Ar^1$ in the general formula (1) has only to be a divalent aromatic group that is not identical to $Ar^2$ in the general formula (2). $Ar^2$ and $Ar^3$ may represent similar groups or different groups. In some cases, it is preferred that $Ar^1$, and $Ar^2$ and $Ar^3$ represent groups having different basic structures because the PC copolymer may show a synergistic effect of characteristics derived from the respective groups.

A chain terminal of the PC copolymer is preferably a monovalent group containing an aromatic group that may be substituted or a fluorine-containing aliphatic group that may be substituted in terms of improvements in electrophotographic characteristics of the electrophotographic photosensitive body.

The aromatic group constituting the chain terminal is preferably an aryl group having 6 to 12 ring-forming carbon atoms, and specific examples thereof include a phenyl group and a biphenylyl group.

The fluorine-containing aliphatic group constituting the chain terminal is, for example, a fluorine-containing alkyl group having 1 to 20 carbon atoms.

Examples of the substituent of the aromatic group or fluorine-containing aliphatic group include a halogen atom such as a fluorine atom, a chlorine atom, or a bromine atom, an alkyl group having 1 to 20 carbon atoms, and a haloalkyl group having 1 to 20 carbon atoms.

[Method of Producing Polycarbonate Copolymer]

The PC copolymer of the present invention is suitably obtained by causing a bischloroformate oligomer having a low monomer number represented by the following formula (I) (hereinafter sometimes abbreviated as "component A"), a dihydric phenol compound represented by the following formula (II) (hereinafter sometimes abbreviated as "component B"), a diamine compound represented by the following formula (III-1) (hereinafter sometimes abbreviated as "component C-1") and/or an acid chloride represented by the following formula (III-2) (hereinafter sometimes abbreviated as "component C-2"), and an acid-binding agent to react with one another. In addition, in the production of the PC copolymer of the present invention, a chain-end terminator such as a monohydric phenolic compound may be used. The use of such oligomer facilitates the production of a PC copolymer whose reduced viscosity $[\eta_{sp}/C]$ falls within the range of from 0.50 to 4.0 (dl/g).

The base amount of the acid-binding agent is preferably from 1.1 to 3.0 molar equivalents per mol of the component A. Therefore, for example, when a monovalent base of acid-binding agent is used, the acid-binding agent is preferably used in an amount of from 1.1 to 3.0 mol per mol of the component A. When the base amount is 1.1 molar equivalents or more, the occurrence of a polymerization failure due to an insufficient base amount can be suppressed. When the base amount is 3.0 molar equivalents or less, excessive hydrolysis of a chloroformate group can be suppressed and the presence ratio represented by $Ar^1/(Ar^1+Ar^2+Ar^3)$ can be easily controlled to fall within the range of from 50 to 65 mol %. In addition, setting the base amount of the acid-binding agent within the range enables the adjustment of the average repeating number n of the repeating unit A within the range of from 1.0 to 3.0.

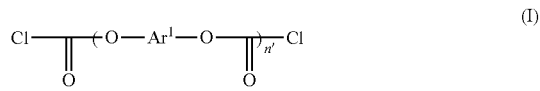

(I)

(II)

(III-1)

(III-2)

n' in the general formula (I) represents an average repeating number of monomer unit and represents from 1.0 to 1.99.

$Ar^1$ to $Ar^3$ in the general formulae (I), (II), (III-1), and (III-2) are the same as those in the general formulae (1) to (3).

Herein, n' representing the average repeating number of monomer unit of the component A is different from the average repeating number n in the repeating unit A. As described in Examples to be described later, a value for n is larger than that for n'. This is because of the following reason: after the component A forming the $Ar^1$ block has been produced, at the time of a reaction with a monomer containing the component B or the chain-end terminator, a chloroformate group at a molecular terminal of the component A reacts with a base present in a reaction system to provide a hydroxyl group and the group may undergo polycondensation with any other molecule of the component A having chlorine at a terminal thereof.

The average repeating number of monomer unit n' of the component A preferably falls within the range of from 1.0 to 1.99 because the production of the PC copolymer of the present invention becomes easy. A method of calculating the average repeating number of monomer unit n' is, for example, a method to be described later in Production Example 1.

[Method of Producing PC Copolymer]

A method of producing the PC copolymer of the present invention is, for example, as follows: comprising causing the component A derived from a dihydric phenol compound represented by the following general formula (8), the component B represented by the general formula (II) having a skeleton different from that of the dihydric phenol compound, and the component C-1 represented by the formula (III-1) and/or the component C-2 represented by the formula (III-2) to undergo polycondensation in a stepwise manner in the presence of the chain-end terminator such as a phenolic compound or a fluorine-containing alcoholic compound.

 (8)

(In the formula, $Ar^1$ is the same as that in the general formula (1).)

In addition, examples of the dihydric phenol compounds represented by the formulae (II) and (8) include a biphenol compound and a bisphenol compound. The biphenol compound is suitable as the compound represented by the formula (II) because the compound contributes to the improvement of the abrasion resistance. Specific examples of the biphenol compound include 4,4'-biphenol, 3,3'-dimethyl-4,4'-biphenol, 3,3',5-trimethyl-4,4'-biphenol, 3-propyl-4,4'-biphenol, 3,3',5,5'-tetramethyl-4,4'-biphenol, 3,3'-diphenyl-4,4'-biphenol, and 3,3'-dibutyl-4,4'-biphenol. Among them, 4,4'-biphenol is preferred because a less colored PC copolymer is obtained. In addition, when any such compound is applied as a PC copolymer for an electrophotographic photosensitive body, the abrasion resistance is improved as well.

In addition, specific examples of the bisphenol compound include 1,1-bis(3-methyl-4-hydroxyphenyl)ethane, 9,9-bis(3-phenyl-4-hydroxyphenyl)fluorene, bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 1,1-bis(4-hydroxyphenyl)-1,1-diphenylmethane, 1,1-bis(4-hydroxyphenyl)-1-phenylethane, 1,1-bis(4-hydroxyphenyl)-1-phenylmethane, bis(4-hydroxyphenyl)ether, bis(4-hydroxyphenyl)sulfide, bis(4-hydroxyphenyl)sulfone, 1,1-bis(4-hydroxyphenyl)cyclopentane, 1,1-bis(3-methyl-4-hydroxyphenyl)cyclopentane, 1,1-bis(4-hydroxyphenyl)cyclohexane, 1,1-bis(4-hydroxyphenyl)-3,3,5-trimethylcyclohexane, 1,1-bis(4-hydroxyphenyl)cyclododecane, 2,2-bis(3-methyl-4-hydroxyphenyl) propane, 2,2-bis(3-phenyl-4-hydroxyphenyl)propane, 2,2-bis(4-hydroxyphenyl) adamantane, 2,2-bis(3-methyl-4-hydroxyphenyl) adamantane, 1,3-bis(4-hydroxyphenyl)adamantane, 1,3-bis(3-methyl-4-hydroxyphenyl)adamantane, 2-(3-methyl-4-hydroxyphenyl)-2-(4-hydroxyphenyl)-1-phenylethane, bis(3-methyl-4-hydroxyphenyl)sulfide, bis(3-methyl-4-hydroxyphenyl)sulfone, bis(3-methyl-4-hydroxyphenyl)methane, 1,1-bis(3-methyl-4-hydroxyphenyl)cyclohexane, resorcin, 2,7-naphthalenediol, 2,6-naphthalenediol, 1,4-naphthalenediol, 1,5-naphthalenediol, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-butyl-4-hydroxy-5-methylphenyl)heptane, 1,1-bis(2-tert-butyl-4-hydroxy-5-methylphenyl)-1-phenylmethane, 1,1-bis(2-tert-amyl-4-hydroxy-5-methylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(3-bromo-4-hydroxy-5-chlorophenyl)propane, 2,2-bis(3,5-dichloro-4-hydroxyphenyl) butane, 2,2-bis(3,5-dibromo-4-hydroxyphenyl)butane, 1-phenyl-1,1-bis(3-fluoro-4-hydroxyphenyl)ethane, bis(3-fluoro-4-hydroxyphenyl)ether, 3,3'-difluoro-4,4'-dihydroxybiphenyl, 1,1-bis(3-cyclohexyl-4-hydroxyphenyl)cyclohexane, 2,2-bis(4-hydroxyphenyl)hexafluoropropane, 1,1-bis(3-phenyl-4-hydroxyphenyl)cyclohexane, bis(3-phenyl-4-hydroxyphenyl)sulfone, 4,4'-(3,3,5-trimethylcyclohexylidene)diphenol, 4,4'-[1,4-phenylenebis(1-methylethylidene)]bisphenol, 4,4'-[1,3-phenylenebis(1-methylethylidene)]bisphenol, 9,9-bis(4-hydroxyphenyl)fluorene, 9,9-bis(4-hydroxy-3-methylphenyl) fluorene, and α,α'-bis(4-hydroxyphenyl)-1,3-diisopropylbenzene.

Among those bisphenol compounds, preferred are 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1,1-diphenylmethane, 1,1-bis(4-hydroxyphenyl)-1-phenylethane, 1,1-bis(4-hydroxyphenyl)cyclohexane, 2,2-bis(3-methyl-4-hydroxyphenyl)propane, 1,1-bis(3-methyl-4-hydroxyphenyl)cyclohexane, 1,1-bis(4-hydroxyphenyl)-3,3,5-trimethylcyclohexane, 1,1-bis(4-hydroxyphenyl)cyclododecane, 1,1-bis(3-methyl-4-hydroxyphenyl)cyclopentane, 2,2-bis(3-phenyl-4-hydroxyphenyl)propane, 2,2-bis(4-hydroxyphenyl) adamantane, resorcin, 2,7-naphthalenediol, 4,4'-[1,4-phenylenebis(1-methylethylidene)] bisphenol, 4,4'-[1,3-phenylenebis(1-methylethylidene)]bisphenol, 9,9-bis(4-hydroxyphenyl)fluorene, 9,9-bis(4-hydroxy-3-methylphenyl) fluorene, bis(4-hydroxyphenyl) ether, and bis(4-hydroxyphenyl) sulfide, and more preferred are 1,1-bis(4-hydroxyphenyl)ethane, 2,2-bis(4-hydroxyphenyl)butane, 2,2-bis(4-hydroxyphenyl)propane, 1,1-bis(4-hydroxyphenyl)-1-phenylethane, 1,1-bis(4-hydroxyphenyl)cyclohexane, 2,2-bis(3-methyl-4-hydroxyphenyl) propane, 1,1-bis(3-methyl-4-hydroxyphenyl)cyclohexane, 1,1-bis(4-hydroxyphenyl)-3,3,5-trimethylcyclohexane, 1,1-bis(4-hydroxyphenyl)cyclododecane, 2,2-bis(4-hydroxyphenyl) adamantane, resorcin, 2,7-naphthalenediol, 9,9-bis(4-hydroxy-3-methylphenyl)fluorene, and bis(4-hydroxyphenyl)ether. One of those bisphenol compounds may be used alone, or two or more thereof may be used in combination.

In addition, specific examples of the component C-1 represented by the formula (III-1) include 1,1-bis(4-aminophenyl)cyclohexane, α,α'-bis(4-aminophenyl)-1,4-diisopropylbenzene, 2,2-bis(4-aminophenyl)propane, 2,2-bis(4-aminophenyl)hexafluoropropane, 2,2-bis(3-aminophenyl) hexafluoropropane, 2,2-bis(3-amino-4-methylphenyl) hexafluoropropane, 2,2-bis(4-amino-3-methylphenyl) hexafluoropropane, 4,4'-diaminodiphenylether, 3,4'-diaminodiphenylether, 1,4-bis(4-aminophenoxy)benzene, 1,3-bis(4-aminophenoxy)benzene, 1,3-bis(3-aminophenoxy)benzene, 4,4'-bis(4-aminophenoxy)biphenyl, 4,4'-bis(3-aminophenoxy) biphenyl, 2,2-bis{4-(4-aminophenoxy)phenyl}propane, 2,2-bis[4-(4-aminophenoxy)phenyl] hexafluoropropane, bis[4-(4-aminophenoxy)phenyl]sulfone, bis[4-(3-aminophenoxy)phenyl]sulfone, 4,4'-diamino-2,2'-bis(trifluoromethyl)diphenylether, bis[4-(4-aminophenoxy)phenyl]ketone, 1,4-bis(4-aminophenoxy)-2,3,5-trimethylbenzene, 1,4-bis(4-aminophenoxy)-2,5-di-t-butylbenzene, 1,4-bis[4-amino-2-(trifluoromethyl)phenoxy]benzene, 2,2-bis[4-{4-amino-2-(trifluoromethyl)phenoxy}phenyl] hexafluoropropane, 4,4'-diamino-2-(trifluoromethyl)diphenylether, 2,3'-diaminodiphenylether, bis(4-aminophenoxy) methane, 1,3-bis(4-aminophenoxy)propane, 1,4-bis(4-aminophenoxy) butane, 1,5-bis(4-aminophenoxy)pentane, 1,2-bis[2-(4-aminophenoxy)ethoxy]ethane, 1,3-bis(4-aminophenoxy)neopentane, 2,2-bis[4-(4-aminophenoxy)-3,5-dibromophenyl]hexafluoropropane, 2,5-bis(4-aminophenoxy)-biphenyl, 4,4'-diamino-3,3'-dichlorobiphenyl, 4,4'-diamino-3,3'-dimethoxybiphenyl, 4,4'-diamino-3,3'-dimethylbiphenyl, 4,4'-diamino-2,2'-dimethylbiphenyl, 4,4'-diamino-2,2'-dimethoxybiphenyl, 4,4'-diamino-2,2'-bis(trifluoromethyl)biphenyl, 4,4'-diamino-2,2',6,6'-tetrachlorobiphenyl, 4,4'-diamino-2,2'-dichlorobiphenyl, 4,4'-diamino-5,5'-dimethoxy-2,2'-dichlorobiphenyl, 4,4'-diaminodiphenylmethane, 3,3'-diaminodiphenylmethane, 3,4'-diaminodiphenylmethane, 4,4'-diamino-3,3'-dimethyldiphenylmethane, 4,4'-diamino-3,3'-dichlorodiphenylmethane, 9,9'-bis(4-aminophenyl)fluorene, 4,4'-diaminodiphenylketone, 3,3'-diaminodiphenylketone, 2,2-bis[4-{4-amino-2-(trifluoromethyl)phenoxy}phenyl]hexafluoropropane, 2,2-bis{4-(4-aminophenoxy)-3,5-dibromophenyl}hexafluoropropane, 4,4'-diaminodiphenylsulfone, 4,4'-diaminodiphenylsulfide, N-(4-aminophenyl)-4-aminobenzamide, N,N'-bis(4-aminophenyl)terephthalamide, 3,5-diaminobenzotrifluoride, 1,4-diaminobenzene, 1,3-diaminobenzene, 2,4-diaminotoluene, and 3,5-diaminotoluene. One of those components C-1 may be used alone, or two or more thereof may be used in combination.

Among those components C-1, preferred are 1,1-bis(4-aminophenyl)cyclohexane, 4,4'-diaminodiphenylether, 9,9-bis(4-aminophenyl)fluorene, 1,4-bis(4-aminophenoxy)butane, 4,4'-diamino-2,2'-dimethylbiphenyl, 4,4'-diamino-3,3'-dimethylbiphenyl, 4,4'-diamino-2,2'-bis(trifluoromethyl)biphenyl, 4,4'-diamino-3,3'-dimethyldiphenylmethane, 4,4'-diamino-3,3'-dichlorodiphenylmethane, 2,2-bis(4-aminophenyl) hexafluoropropane, 4,4'-diaminodiphenylsulfone, 2,2-bis[4-(4-aminophenoxy)phenyl]propane, and 1,4-diaminobenzene.

When a urethane-copolymerized PC produced using each of such diamines as a monomer is applied to an electrophotographic photosensitive body, abrasion hardly occurs even if friction is applied by paper or a blade for cleaning due to a pseudo-crosslink by a strong hydrogen bond in addition to a rigid primary skeleton. As a result, the abrasion resistance improves.

In addition, specific examples of the component C-2 represented by the general formula (III-2) include, but not limited to, compounds shown below. Among those compounds, compounds (a), (e), (f), (h), and (i) are preferred.

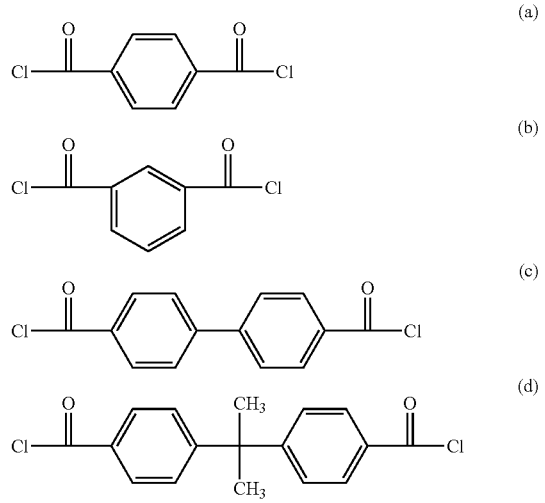

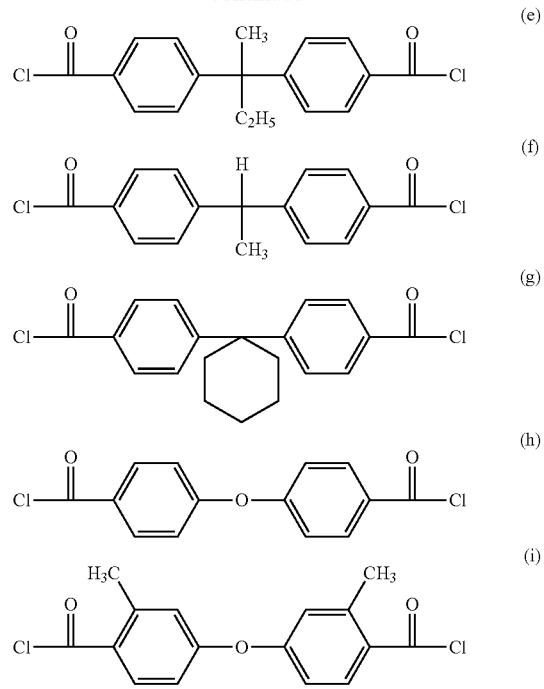

The PC copolymer of the present invention is obtained by: causing, for example, the dihydric phenol compound represented by the general formula (8) and phosgene to react with each other to produce the component A; and subjecting the component to interfacial polycondensation with the component B, and the component C-1 and/or the component C-2.

In order that the PC copolymer of the present invention may be satisfactorily produced with the component C-1, the following procedure is preferred: at a reaction initiation stage, a polymerization reaction between the component A and the component C-1 in the presence of a solvent, the acid-binding agent, and a catalyst is performed in the presence of a weakly basic acid-binding agent, and the component B is added preferably within from 10 to 30 minutes after the initiation of the reaction to perform the final reaction. Examples of the weakly basic acid-binding agent include sodium carbonate, potassium carbonate, sodium hydrogen carbonate, potassium hydrogen carbonate, and calcium acetate. Adopting such procedure enables efficient introduction of a urethane bond as well as a carbonate bond into the PC copolymer of the present invention.

In addition, in the PC copolymer, the amount of a repeating unit derived from the component C-1 needs to be smaller than the amount of a repeating unit derived from the component A, so the used amount of the component C-1 is smaller than that of the component A. Accordingly, most of the reaction mixture may have a both-terminal of bischloroformate that the component A is present at each of both terminals. The bischloroformate reacts with the component B, so a bond between the component B and the component C is suppressed. The foregoing is preferred because the average repeating number n of the repeating unit A can be adjusted within a desired range. On the other hand, a strongly basic acid-binding agent such as sodium hydroxide is used in a reaction between the component A and the component B, so when the component A and the component B are caused to react with each other before the component C-1 is caused to react with the resultant, chain growth by addition of the component C-1 is inhibited by an influence of the strongly basic acid-binding agent remaining in a reaction system, which makes it difficult to increase the content of the repeating unit derived from the component C-1 present in the PC copolymer.

In order that the PC copolymer of the present invention may be satisfactorily produced with the component C-2, the following procedure is preferred: at a reaction initiation stage, the component A and the component C-2 are mixed in the presence of the solvent, and then the component B, the acid-binding agent, and the catalyst are added to perform a polymerization reaction. In this case, the component C needs to be completely dissolved by mixing the component A and the component C-2 in the presence of the solvent and stirring the mixture. Adopting such procedure enables efficient introduction of an ester bond as well as a carbonate bond into the PC copolymer of the present invention. In addition, in the PC copolymer, the amount of a repeating unit derived from the component C-2 needs to be smaller than the amount of the repeating unit derived from the component A, and hence the used amount of the component C-2 is smaller than that of the component A. Accordingly, a reaction between the component C-2 and the component A becomes dominant over a reaction between the component C-2 and the component B, and hence the bond between the component B and the component C is suppressed. The foregoing is preferred because the average repeating number n of the repeating unit A can be adjusted within a desired range.

Any such reaction is performed in the presence of the chain-end terminator or a branching agent as required.

As the terminal stopper for generating the chain terminal, there can be used a monovalent carboxylic acid or a derivative thereof, or a monohydric phenolic compound. For example, suitably used are p-tert-butyl-phenol, p-phenyl-phenol, p-cumylphenol, p-perfluorononylphenol, p-(perfluorononylphenyl)phenol, p-(perfluorohexyl)phenol, p-tert-perfluorobutylphenol, p-perfluorooctylphenol, 1-(p-hydroxybenzyl) perfluorodecane, p-[2-(1H,1H-perfluorotridodecyloxy)-1,1,1,3,3,3-hexafluoropropyl]phenol, 3,5-bis(perfluorohexyloxycarbonyl)phenol, perfluorododecyl p-hydroxybenzoate, p-(1H,1H-perfluorooctyloxy)phenol, 2H,2H,9H-perfluorononanoic acid, 1,1,1,3,3,3-tetrafluoro-2-propanol, alcohols represented by the following formulae (9) and (10), and the like.

(n represents an integer of from 1 to 12.)

(m represents an integer of from 1 to 12.)

The addition ratio of any such terminal stopper in terms of a copolymerization composition ratio is preferably 0.05 mol % or more and 30 mol % or less, more preferably 0.1 mol % or more and 10 mol % or less. The ratio is preferably 30 mol % or less in terms of a mechanical strength and is preferably 0.05 mol % or more in terms of moldability.

In addition, specific examples of the branching agent include phloroglucin, pyrogallol, 4,6-dimethyl-2,4,6-tris(4-hydroxyphenyl)-2-heptene, 2,6-dimethyl-2,4,6-tris(4-hydroxyphenyl)-3-heptene, 2,4-dimethyl-2,4,6-tris(4-hydroxyphenyl)heptane, 1,3,5-tris(2-hydroxyphenyl)benzene, 1,3,5-tris(4-hydroxyphenyl)benzene, 1,1,1-tris(4-hydroxyphenyl)ethane, tris(4-hydroxyphenyl)phenylmethane, 2,2-bis[4,4-bis(4-hydroxyphenyl)cyclohexyl]propane, 2,4-bis[2-bis(4-hydroxyphenyl)-2-propyl]phenol, 2,6-bis(2-hydroxy-5-methylbenzyl)-4-methylphenol, 2-(4-hydroxyphenyl)-2-(2,4-dihydroxyphenyl)propane, tetrakis (4-hydroxyphenyl)methane, tetrakis[4-(4-hydroxyphenylisopropyl)phenoxy]methane, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxindole, 5-chloroisatin, 5,7-dichloroisatin, and 5-bromoisatin.

The addition ratio of any such branching agent in terms of a copolymerization composition ratio is 30 mol % or less, preferably 5 mol % or less. The ratio is preferably 30 mol % or less in terms of moldability.

When the interfacial polycondensation is performed, examples of the acid-binding agent include: alkali metal hydroxides such as sodium hydroxide, potassium hydroxide, lithium hydroxide, and cesium hydroxide; alkaline earth metal hydroxides such as magnesium hydroxide and calcium hydroxide; carbonates such as sodium carbonate, potassium carbonate, calcium carbonate, and magnesium carbonate; trialkylamines such as triethylamine, trimethylamine, and tripropylamine; and organic bases such as N-methylmorpholine, tetramethylethylenediamine, triethylenediamine, diazabicycloundecene, dimethylaniline, diethylaniline, dipropylaniline, and pyridine. Among them, preferred are: alkali metal hydroxides such as sodium hydroxide, potassium hydroxide, and calcium hydroxide; alkaline earth metal hydroxides; and amine compounds such as triethylamine, dimethylaniline, and diethylaniline. In addition, those acid-binding agents may be used as a mixture.

The solvent to be used in this case has only to dissolve a polymer to be obtained at a certain level or more. Suitable examples thereof include: aromatic hydrocarbons such as toluene and xylene; halogenated hydrocarbons such as methylene chloride, chloroform, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene; ketones such as cyclohexanone, acetone, and acetophenone; and ethers such as tetrahydrofuran and 1,4-dioxane. One of those solvents may be used alone, or two or more thereof may be used in combination. Further, an interfacial polycondensation reaction may be performed with two kinds of solvents that are immiscible with each other.

In addition, suitable examples of the catalyst include: tertiary amines such as trimethylamine, triethylamine, tributylamine, N,N-dimethylcyclohexylamine, pyridine, N,N-diethylaniline, and N,N-dimethylaniline; quaternary ammonium salts such as trimethylbenzylammonium chloride, triethylbenzylammonium chloride, tributylbenzylammonium chloride, trioctylmethylammonium chloride, tetrabutylammonium chloride, and tetrabutylammonium bromide; and quaternary phosphonium salts such as tetrabutylphosphonium chloride and tetrabutylphosphonium bromide.

Further, as required, a small amount of an antioxidant such as sodium sulfite or a hydrosulfite salt may be added to the reaction system.

A method of producing the component A is preferably the following method because of, for example, the following reason: a washing step at the time of the production of the polycarbonate copolymer can be simplified.

A method described in Production Examples to be described later is available as a method of producing such bischloroformate oligomer that n' in the formula (I) falls within the range of from 1.0 to 1.99. First, the dihydric phenol compound represented by the general formula (8) is suspended in a hydrophobic solvent such as methylene chloride, and phosgene is added to the suspension to form a mixed solution. Meanwhile, a tertiary amine such as triethylamine is dissolved in a hydrophobic solvent such as methylene chloride to form a solution, and the solution is dropped in the mixed solution and caused to react with the solution at a temperature equal to or less than room temperature. Hydrochloric acid and pure water are added to the residual liquid of the resultant reaction mixture to wash the liquid, thereby providing an organic layer containing a polycarbonate oligomer having a low monomer number.

A reaction temperature is ordinarily from 0 to 30° C., preferably from 5 to 20° C. under cooling. A drop time and a reaction time are both from 15 minutes to 4 hours, preferably from about 30 minutes to 3 hours. The average repeating number of monomer unit (n') of the component A thus obtained is preferably from 1.00 to 1.99, more preferably from 1.00 to 1.60.

The component B, and the component C-1 and/or the component C-2 are added to, and caused to react with, the organic phase containing the component A thus obtained. A reaction temperature is from about 0 to 100° C., preferably from 5 to 40° C., particularly preferably from 10 to 25° C.

Although a reaction pressure may be any one of reduced pressure, normal pressure, and increased pressure, the reaction can be suitably performed under normal pressure or about the self-pressure of a reaction system in ordinary cases. A reaction time, which depends on the reaction temperature, is generally from 0.5 minute to 10 hours, preferably from about 1 minute to 3 hours.

In the reaction, the component B, the component C-1, and the component C-2 are each desirably added as an aqueous solution or an organic solvent solution. It should be noted that the catalyst, the chain-end terminator, the branching agent, and the like can be added and used as required at one or both of the time of the production of the component A and the time of the subsequent polymerization in the above-mentioned production method.

In addition, the PC copolymer of the present invention may contain a polycarbonate unit having a structural unit except $Ar^1$, $Ar^2$, and $Ar^3$, or a unit having a polyether structure or the like to such an extent that the achievement of the object of the present invention is not inhibited.

It should be noted that the reduced viscosity [$\eta_{sp}$/C] of the resultant PC copolymer can be set to fall within the range described above by various methods such as the selection of the reaction conditions, and the regulation of the usages of the branching agent and the terminal stopper. Alternatively, in some cases, a PC copolymer having a predetermined reduced viscosity [$\eta_{sp}$/C] can be achieved by appropriately subjecting the resultant PC copolymer to physical treatment (such as mixing or fractionation) and/or chemical treatment (such as a polymer reaction, crosslinking treatment, or partial decomposition treatment).

In addition, the resultant reaction product (crude product) can be subjected to various post-treatments such as a known separation purification method so that a product having a desired purity (degree of purification) may be collected as a PC copolymer.

[Coating Liquid]

The coating liquid of the present invention contains at least the PC copolymer of the present invention, and a solvent capable of dissolving or dispersing the PC copolymer. In addition, the coating liquid may contain a low-molecular weight compound, a colorant such as a dye or a pigment, a functional compound such as a charge transport material, an electron-transporting material, a hole-transporting material, or a charge generation material, a filler such as an inorganic or organic filler, a fiber, or a fine particle, or an additive such as an antioxidant, a UV absorber, or an acid acceptor in addition to the foregoing. A substance that may be incorporated in addition to the resin is exemplified by substances to be incorporated into the constituent components of the electrophotographic photosensitive body to be described later. In addition, the coating liquid may contain any other resin as long as the effect of the present invention is not impaired, and examples thereof are listed below as examples of the constituent components of the electrophotographic photosensitive body.

In addition, a single solvent or a mixture of a plurality of solvents can be used as the solvent to be used in the present invention in consideration of, for example, its solubility or dispersibility for the PC copolymer and any other material, viscosity, evaporation rate, chemical stability, and stability against a physical change.

At least one of non-halogen solvent selected from the following solvents is preferred as a specific example of the solvent to be used for the coating liquid of the present invention from the viewpoint of solubility: an aromatic solvent, an ether solvent, a ketone solvent, an amide solvent, and an ester solvent.

Examples of the aromatic solvent include toluene, xylene, anisole, trimethylbenzene, and any other aromatic high-boiling-point solvent (a commercial product such as "Ipsol (trade name, manufactured by Idemitsu Kosan Co., Ltd.)").

Examples of the ether solvent include tetrahydrofuran, dioxane, cyclopentyl monomethyl ether, ethylene glycol monomethyl ether acetate, propylene glycol monomethyl ether acetate (PMA), diethylene glycol monobutyl ether acetate, and diethylene glycol monoethyl ether acetate.

Examples of the ketone solvent include cyclohexanone, methyl isobutyl ketone, methyl ethyl ketone, and diisobutyl ketone.

Examples of the amide solvent include dimethylformamide, dimethylsulfoxide, and diethylformamide.

Examples of the ester solvent include ethyl acetate, ethyl cellosolve, methyl acetate, butyl acetate, methoxybutyl acetate, cellosolve acetate, amyl acetate, n-propyl acetate, isopropyl acetate, methyl lactate, ethyl lactate, and butyl lactate.

The concentration of the PC copolymer component in the coating liquid, which has only to provide a proper viscosity that suits the usage of the coating liquid, is preferably from 0.1 to 40 mass %, more preferably from 1 to 35 mass %, most preferably from 5 to 30 mass %. When the concentration of the PC copolymer component is 40 mass % or less, the viscosity of the coating liquid sufficiently reduces and hence its coatability improves. When the concentration is 0.1 mass % or more, the viscosity becomes sufficiently high, and hence the coating liquid hardly flows and a uniform film can be easily obtained. In addition, a drying time after coating is shortened and hence a problem in that a target film thickness cannot be achieved can be suppressed.

The PC copolymer of the present invention has good compatibility with the charge transport material. In addition, the copolymer neither whitens nor turns into a gel even when dissolved in the solvent. Therefore, the coating liquid of the present invention containing the copolymer and the solvent, and preferably further containing the charge generation material can be stably stored while preventing its polymer component from whitening or gelling over a long time period. In addition, when the photosensitive layer of an electrophotographic photosensitive body is formed by using the coating liquid, an excellent electrophotographic photosensitive body whose photosensitive layer does not crystallize and that causes no defect in terms of image quality can be produced.

In addition, in ordinary cases, a ratio between the PC copolymer and charge transport material in the coating liquid is desirably set to from 20:80 to 80:20, preferably from 30:70 to 70:30 in terms of a mass ratio.

In the coating liquid of the present invention, one of the PC copolymers of the present invention may be used alone, or two or more thereof may be used in combination.

In ordinary cases, the coating liquid of the present invention is suitably used in the formation of the charge transport layer of a laminated electrophotographic photosensitive body whose photosensitive layer includes at least a charge generation layer and the charge transport layer. The coating liquid can also be used in the formation of the photosensitive layer of a monolayer electrophotographic photosensitive body by further incorporating the charge generation material into the liquid.

[Electrophotographic Photosensitive Body]

The electrophotographic photosensitive body of the present invention may be any one of the electrophotographic photosensitive bodies including known electrophotographic photosensitive bodies of various types as long as the above-mentioned PC copolymer is used in its photosensitive layer. The electrophotographic photosensitive body is preferably a laminated electrophotographic photosensitive body whose photosensitive layer includes at least one charge generation layer and at least one charge transport layer, or a monolayer electrophotographic photosensitive body whose photosensitive layer includes a charge generation material and a charge transport material in a single layer.

Although the PC copolymer may be used in any portion in the photosensitive layer, the PC copolymer is desirably used as a binder resin for a charge moving substance in a charge transport layer, as a binder resin for a single photosensitive layer, or as a surface protective layer in order that an effect of the present invention may be sufficiently exhibited. In the case of a multilayer electrophotographic photosensitive body having two charge transport layers, the PC copolymer is preferably used in one of the charge transport layers. The PC copolymer of the present invention exhibits satisfactory electrophotographic characteristics when used as a binder resin for an electrophotographic photosensitive body.

In the electrophotographic photosensitive body of the present invention, one of the PC copolymers of the present invention described above may be used alone, or two or more thereof may be used in combination. In addition, binder resin components such as other polycarbonates may each be incorporated as desired to such an extent that the object of the present invention is not inhibited. Further, an additive such as an antioxidant may be incorporated.

The electrophotographic photosensitive body of the present invention includes the photosensitive layer formed on the conductive substrate. When the photosensitive layer includes a charge generation layer and a charge transport layer, the charge transport layer may be laminated on the charge generation layer, or the charge generation layer may be laminated on the charge transport layer. Alternatively, the photosensitive layer may simultaneously contain a charge generation material and a charge transport material in a single layer. Further alternatively, a conductive or insulative protective film may be formed on the surface layer as required. Further, for example, the electrophotographic photosensitive body may be such that an intermediate layer such as an adhesive layer for improving adhesiveness between layers or a blocking layer that serves to block charge is formed.

Any one of various materials such as known materials can be used as a material for the conductive substrate to be used for the electrophotographic photosensitive body of the present invention. Specific examples of the material that can be used include: a plate, drum, or sheet formed of aluminum, nickel, chromium, palladium, titanium, molybdenum, indium, gold, platinum, silver, copper, zinc, brass, stainless steel, lead oxide, tin oxide, indium oxide, indium tin oxide (tin-doped indium oxide: ITO), or graphite; a glass, cloth, paper, or plastic film, sheet, or seamless belt subjected to conductive treatment as a result of coating with a material by, for example, vapor deposition, sputtering, or application; and a metal drum subjected to metal oxidation treatment by, for example, electrode oxidation.

The charge generation layer includes at least a charge generation material, and the charge generation layer can be obtained by: forming a layer of the charge generation material on a base substrate for the charge generation layer by a vacuum vapor deposition method, a sputtering method, or the like; or forming a layer obtained by binding the charge generation material with a binder resin onto a base substrate for the charge generation layer. Anyone of various methods such as known methods can be employed as a method of forming the charge generation layer involving the use of a binder resin. In most cases, for example, a method involving applying a coating liquid prepared by dispersing or dissolving the charge generation material and the binder resin in a proper solvent onto a predetermined base substrate and drying the applied liquid to obtain a wet molded body is suitably employed.

Any one of various known materials can be used as the charge generation material in the charge generation layer. Specific compounds include: selenium elementary substances such as amorphous selenium and trigonal selenium; selenium alloys such as a selenium-tellurium alloy; selenium compounds or selenium-containing compositions such as $As_2Se_3$; inorganic materials each composed of elements belonging to Groups 12 and 16 such as zinc oxide and CdS—Se; oxide semiconductors such as titanium oxide; silicon materials such as amorphous silicon; metal-free phthalocyanine pigments such as τ-type metal-free phthalocyanine and χ-type metal-free phthalocyanine; metal phthalocyanine pigments such as α-copper phthalocyanine, β-copper phthalocyanine, γ-copper phthalocyanine, ε-copper phthalocyanine, X-copper phthalocyanine, A-type titanyl phthalocyanine, B-type titanyl phthalocyanine, C-type titanyl phthalocyanine, D-type titanyl phthalocyanine, E-type titanyl phthalocyanine, F-type titanyl phthalocyanine, G-type titanyl phthalocyanine, H-type titanyl phthalocyanine, K-type titanyl phthalocyanine, L-type titanyl phthalocyanine, M-type titanyl phthalocyanine, N-type titanyl phthalocyanine, Y-type titanyl phthalocyanine, oxotitanyl phthalocyanine, titanyl phthalocyanine showing a strong diffraction peak at a Bragg angle 2θ in an X-ray diffraction pattern of 27.3±0.2°, and gallium phthalocyanine; a cyanine dye; an anthracene pigment; a bisazo pigment; a pyrene pigment; a polycyclic quinone pigment; a quinacridone pigment; an indigo pigment; a perylene pigment; a pyrylium dye; a squarylium pigment; an anthanthrone pigment; a benzimidazole pigment; an azo pigment; a thioindigo pigment; a quinoline pigment; a lake pigment; an oxazine pigment; a dioxazine pigment; a triphenylmethane pigment; an azlenium dye; a triarylmethane dye; a xanthine dye; a thiazine dye; a thiapyrylium dye; polyvinyl carbazole; and a bisbenzimidazole pigment. One of those compounds may be used alone as the charge generation material, or two or more thereof may be used in the form of a mixture as the charge generation material. Among those charge generation materials, materials specifically described in JP 11-172003 A are suitable examples.

The charge transport layer can be obtained as a wet molded body by forming, on a base substrate, a layer obtained by binding a charge transport material with the binder resin.

The binder resin for the charge generation layer and charge transport layer described above is not particularly limited, and any one of various known resins can be used. Specific examples of the binder resin include polystyrene, polyvinyl chloride, polyvinyl acetate, a vinyl chloride-vinyl acetate copolymer, polyvinylacetal, an alkyd resin, an acrylic resin, polyacrylonitrile, polycarbonate, polyurethane, an epoxy resin, a phenol resin, polyamide, polyketone, polyacrylamide, a butylal resin, a polyester resin, a vinylidene chloride-vinyl chloride copolymer, a methacrylic resin, a styrene-butadiene copolymer, a vinylidene chloride-acrylonitrile copolymer, a vinyl chloride-vinyl acetate-maleic anhydride copolymer, a silicone resin, a silicone-alkyd resin, a phenol-formaldehyde resin, a styrene-alkyd resin, a melamine resin, a polyether resin, a benzoguanamine resin, an epoxyacrylate resin, a urethaneacrylate resin, poly-N-vinylcarbazole, polyvinylbutylal, polyvinylformal, polysulfone, casein, gelatin, polyvinyl alcohol, ethylcellulose, nitrocellulose, carboxy-methyl cellulose, vinylidene chloride-based polymer latex, an acrylonitrile-butadiene copolymer, a vinyltoluene-styrene copolymer, a soybean oil-modified alkyd resin, nitrated polystyrene, polymethylstyrene, polyisoprene, polythiocarbonate, polyarylate, polyhaloarylate, polyallyl ether, polyvinyl acrylate, and polyester acrylate.

One of those resins may be used alone, or two or more thereof may be used as a mixture. It should be noted that the PC copolymer of the present invention described above is suitably used as a binder resin in the charge generation layer or charge transport layer.

Although any one of the various known modes can be employed as a method of forming the charge transport layer, the following method is suitable. A coating liquid prepared by dispersing or dissolving the charge transport material in a proper solvent together with the PC copolymer of the present invention is applied onto a predetermined substrate serving as a ground, and is then dried so as to be obtained as a wet molded body. A blending ratio between the charge transport material and the PC resin to be used in the formation of the charge transport layer is preferably from 20:80 to 80:20, more preferably from 30:70 to 70:30 in terms of a mass ratio.

In the charge transport layer, one of the PC resins of the present invention may be used alone, or two or more thereof may be used as a mixture. Alternatively, other binder resins can each be used in combination with the PC copolymer of the present invention to such an extent that the object of the present invention is not inhibited.

The thickness of the charge transport layer thus formed is generally from about 5 to 100 μm, preferably from 10 to 30 μm. When the thickness is less than 5 μm, an initial potential may reduce. When the thickness exceeds 100 μm, a reduction in electrophotographic characteristic may occur.

Any one of various known compounds can be used as a charge transport material that can be used together with the PC copolymer of the present invention. Examples of those compounds each suitably used include a carbazole compound, an indole compound, an imidazole compound, an oxazole compound, a pyrazole compound, an oxadiazole compound, a pyrazoline compound, a thiadiazole compound, an aniline compound, a hydrazone compound, an aromatic amine compound, an aliphatic amine compound, a stilbene compound, a fluorenone compound, a butadiene compound, an enamine compound, a quinone compound, a quinodimethane compound, a triazole compound, a triazole compound, an imidazolone compound, an imidazolidine compound, a bisimidazolidine compound, an oxazolone compound, a benzothiazole compound, a benzimidazole compound, a quinazoline compound, a benzofuran compound, an acridine compound, a phenazine compound, poly-N-vinylcarbazole, polyvinylpyrene, polyvinylanthracene, polyvinylacridine, poly-9-vinylphenylanthracene, a pyrene-formaldehyde resin, an ethylcarbazole resin, and a polymer having a structure of any such compound at a main chain or a side chain. One of those compounds may be used alone, or two or more thereof may be used in combination.

Among those charge transport materials, compounds specifically given in JP 11-172003 A, charge transport materials represented by the following structures, and compounds used in Examples are particularly suitably used.

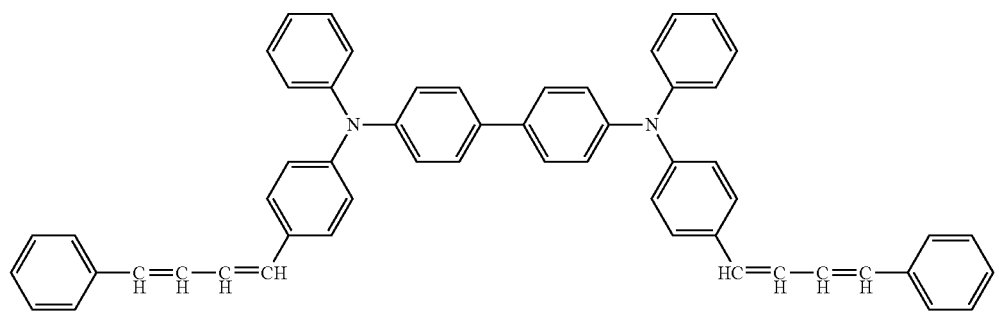

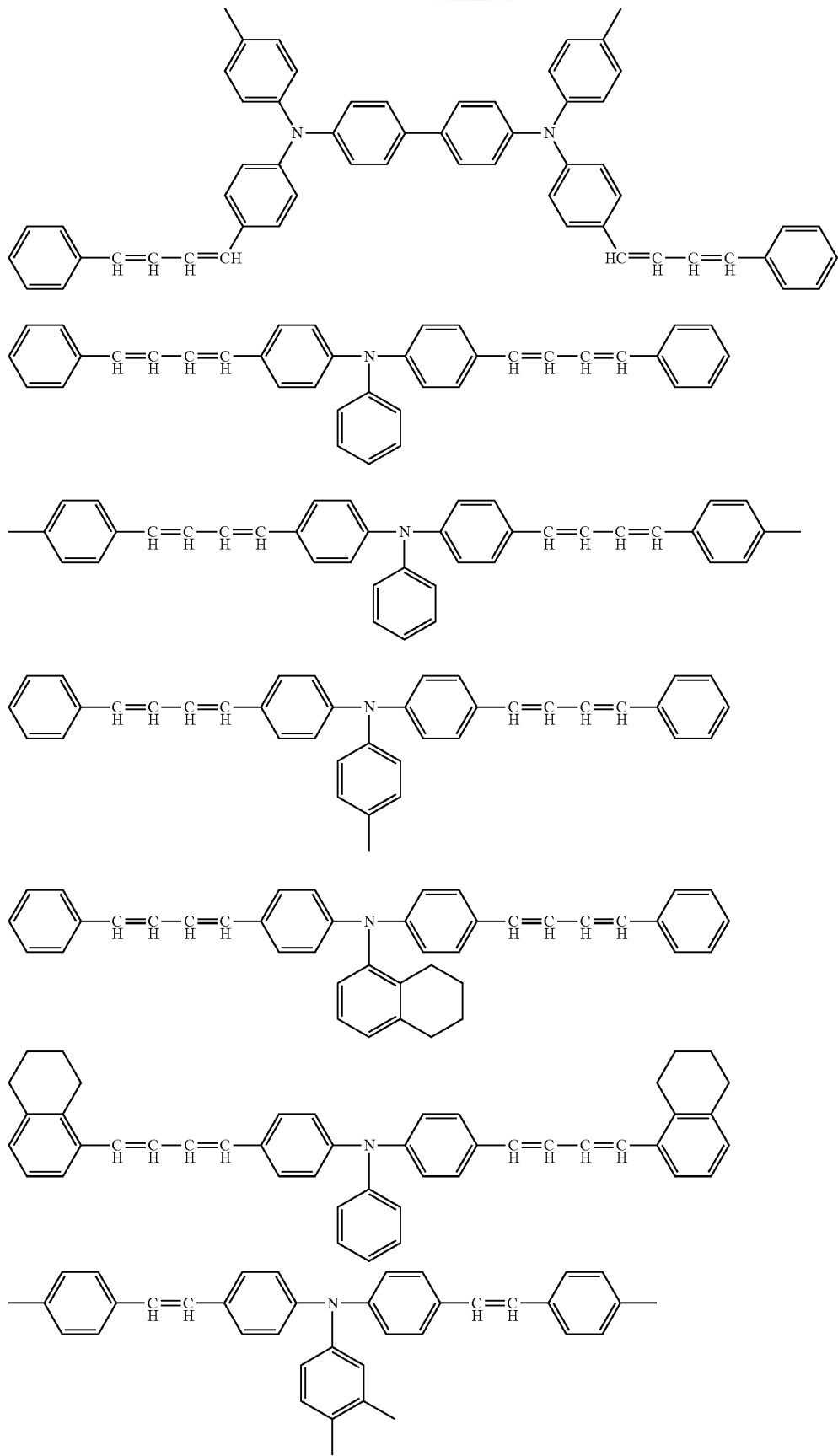

-continued
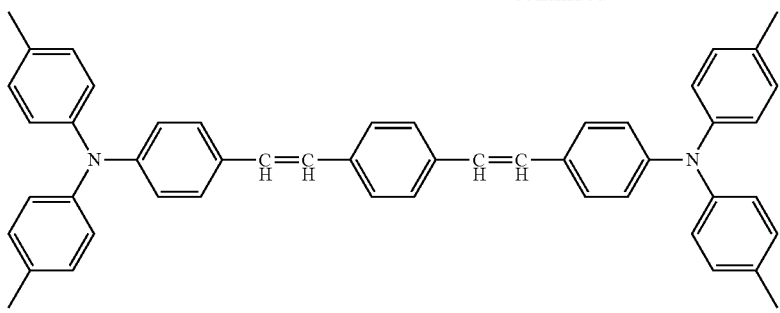
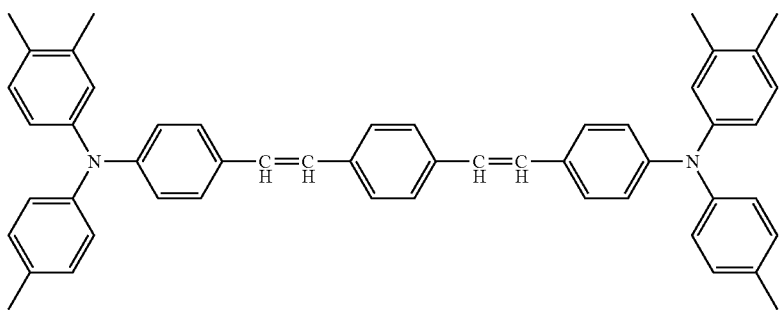
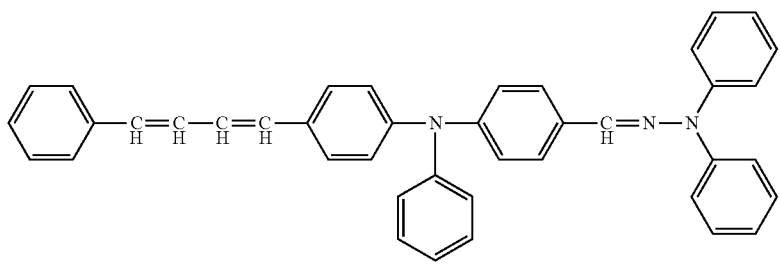
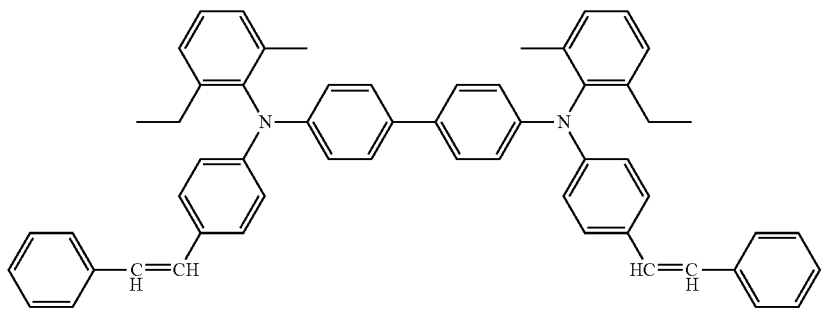
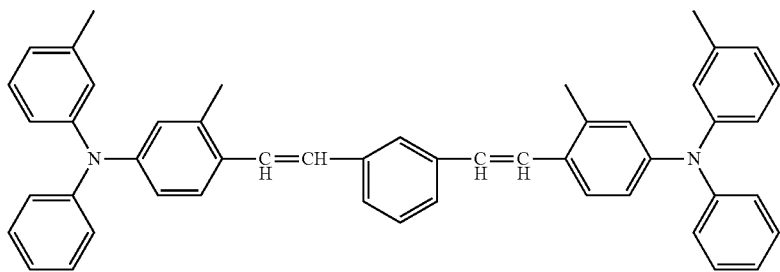

-continued
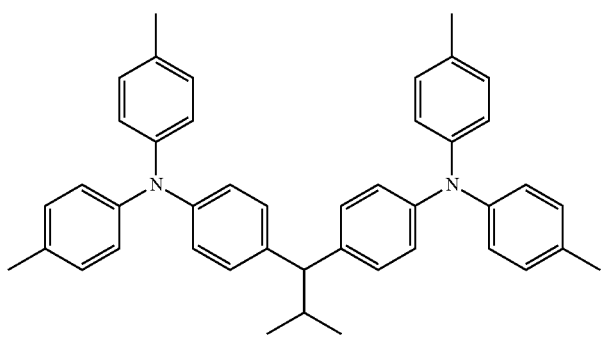
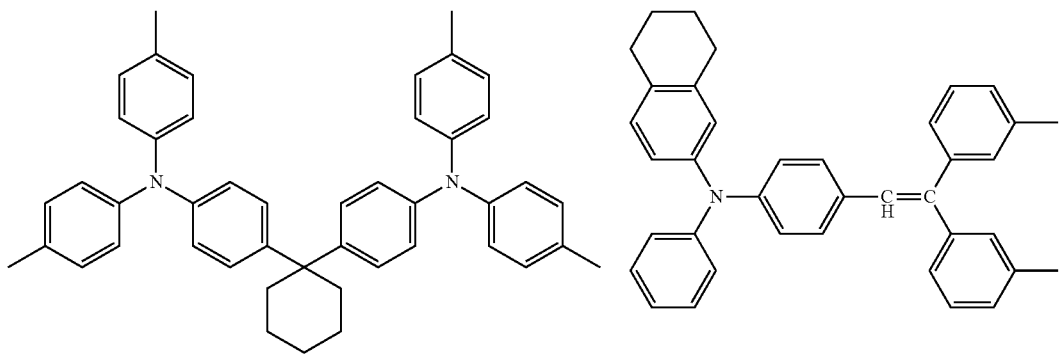
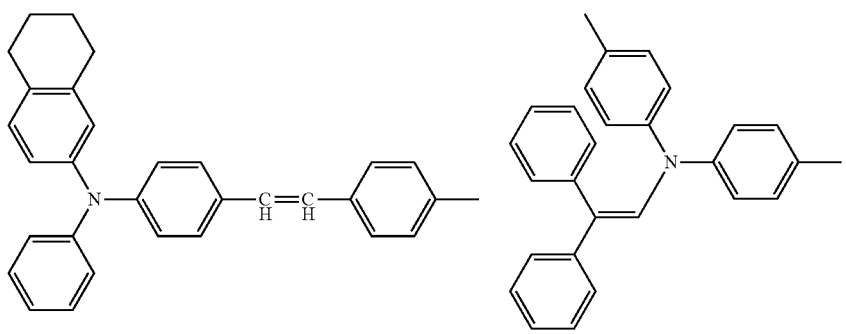
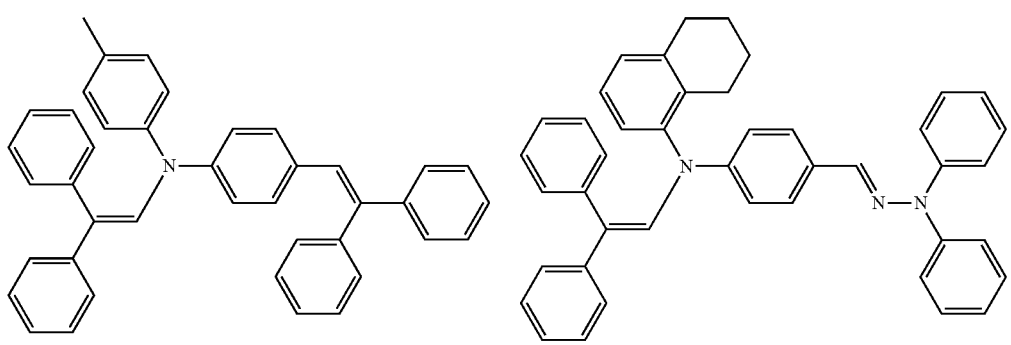
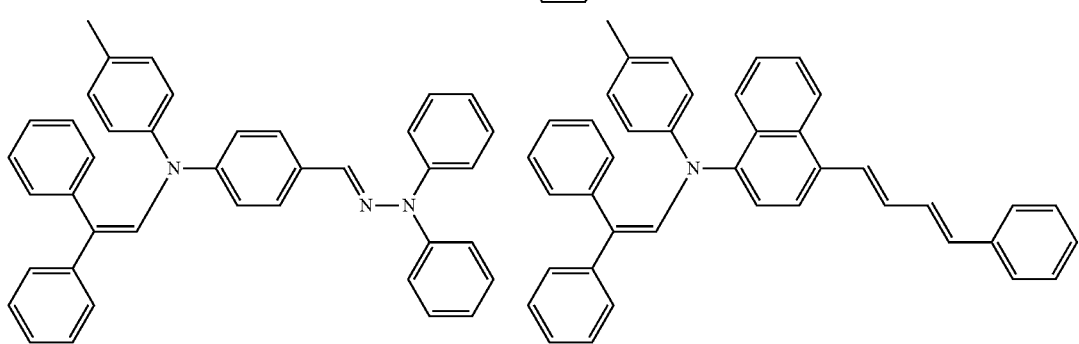

-continued
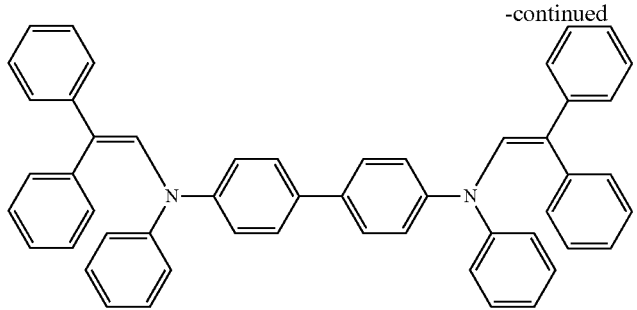
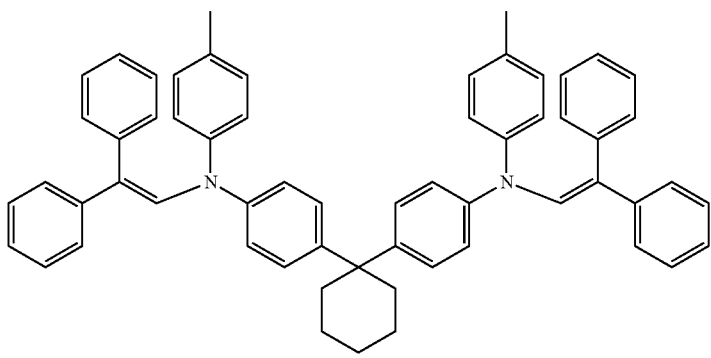
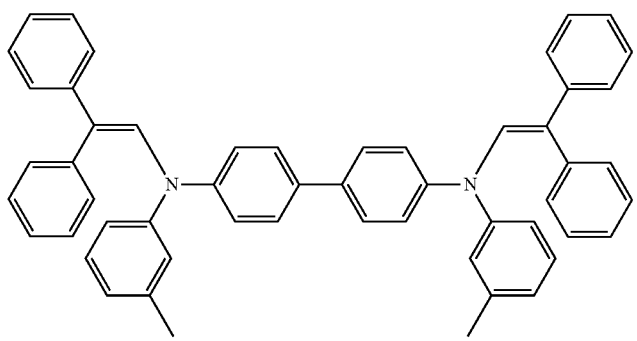
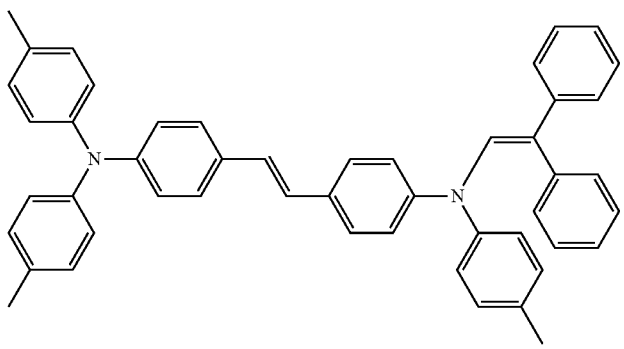
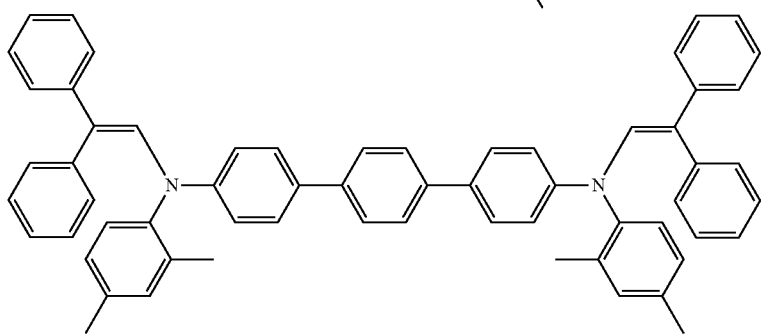

-continued
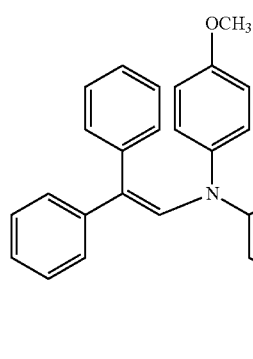 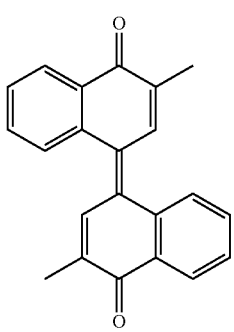
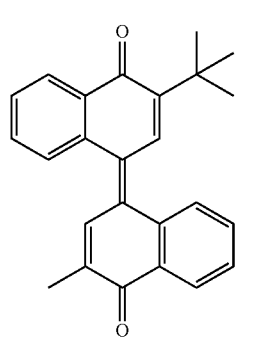 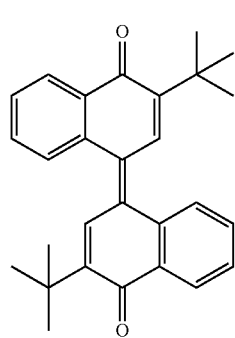 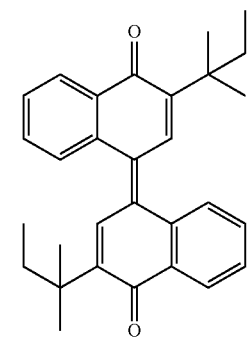
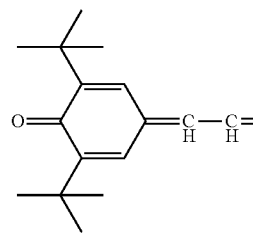 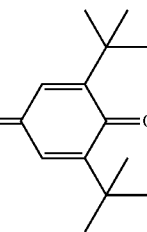
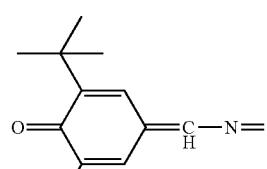 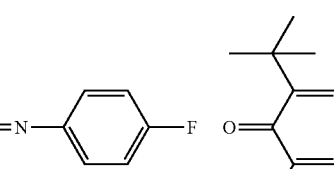
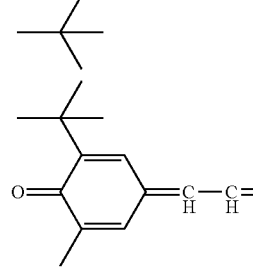 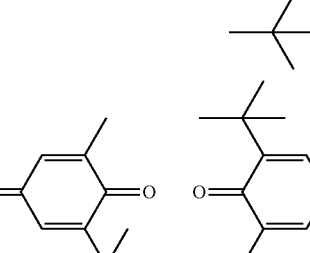
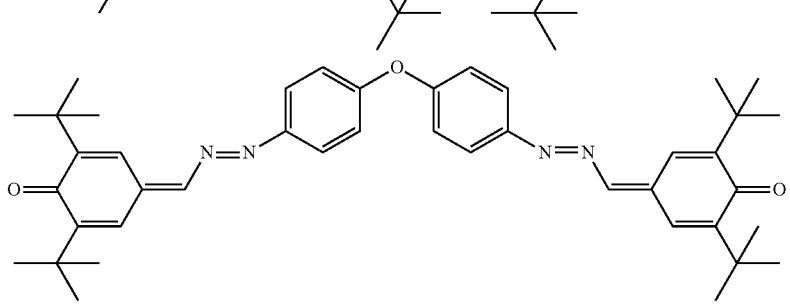 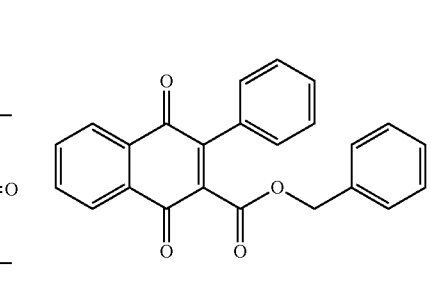

-continued

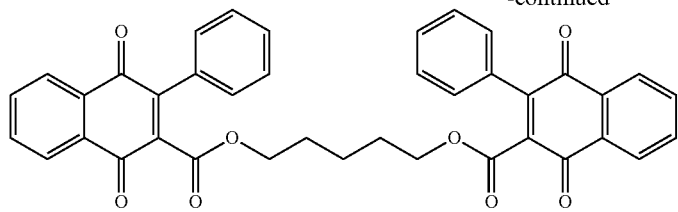

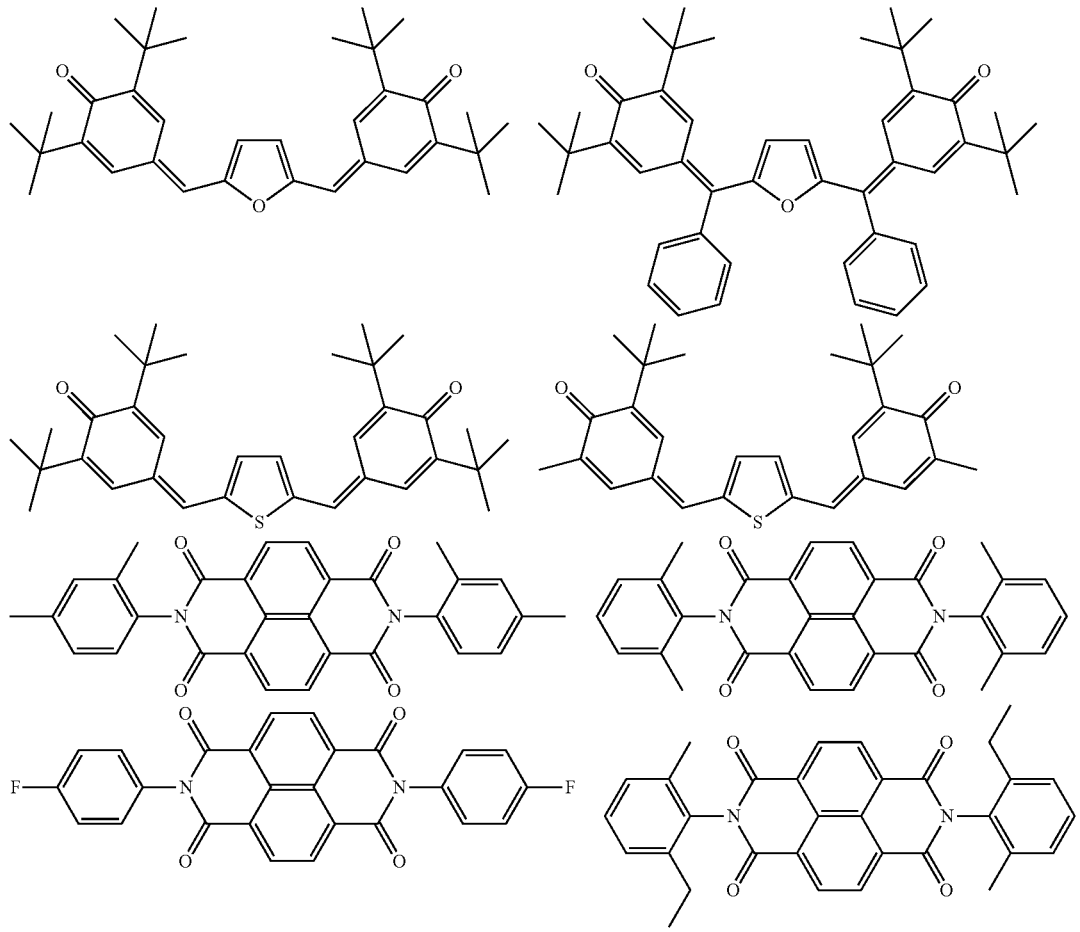

It should be noted that the PC copolymer of the present invention is suitably used as a binder resin in at least one of the charge generation layer and the charge transport layer in the electrophotographic photosensitive body of the present invention.

In the electrophotographic photosensitive body of the present invention, an undercoat layer that is generally used can be formed between the conductive substrate and the photosensitive layer. As the undercoat layer, there can be used: fine particles of titanium oxide, aluminum oxide, zirconia, titanate, zirconate, lanthanum lead, black titanium, silica, lead titanate, barium titanate, tin oxide, indium oxide, or silicon oxide; or a component of a polyamide resin, a phenol resin, casein, a melamine resin, a benzoguanamine resin, a polyurethane resin, an epoxy resin, cellulose, nitrocellulose, polyvinyl alcohol, or a polyvinylbutylal resin. In addition, the binder resin may be used as a resin for use in the undercoat layer, or the PC copolymer of the present invention may also be used as the resin. One of those fine particles and resins may be used alone, or various kinds thereof may be used as a mixture. When those fine particles and resins are used as a mixture, inorganic fine particles and a resin are suitably used in combination because a coating film having good smoothness can be formed.

The undercoat layer has a thickness of generally from 0.01 to 10 μm, preferably from 0.1 to 7 μm. When the thickness is less than 0.01 μm, it is difficult to uniformly form the undercoat layer. In addition, when the thickness exceeds 10 μm, the electrophotographic characteristics may decrease. In addition, a known blocking layer that is generally used can be formed between the conductive substrate and the photosensitive layer. The same kind of a resin as that of the binder resin can be used in the blocking layer. Further, the polycarbonate resin of the present invention may also be used. The blocking layer has a thickness of generally from 0.01 to 20 μm, preferably from 0.1 to 10 μm. When the thickness is 0.01 μm or less, it is difficult to uniformly form the blocking layer. In addition, when the thickness exceeds 20 μm, the electrophotographic characteristics may decrease.

Further, a protective layer may be laminated on the photosensitive layer in the electrophotographic photosensitive body of the present invention. The same kind of a resin as that of the binder resin can be used in the protective layer. In addition, the PC copolymer of the present invention is particularly preferably used. The protective layer has a thickness of generally from 0.01 to 20 μm, preferably from 0.1 to 10 μm. Further, the charge generation material, the charge transport material, an additive, a metal or a metal oxide, nitride, salt, or alloy, carbon black, or a conductive material such as an organic conductive compound may be incorporated into the protective layer.

Further, a binder, a plasticizer, a curing catalyst, a fluidity imparting agent, a pinhole controlling agent, or a spectral sensitizer (sensitizing dye) may be added to each of the charge generation layer and the charge transport layer in order that the performance of the electrophotographic photosensitive body may be improved. In addition, any one of the additives such as various chemical substances, antioxidants, surfactants, curl inhibitors, and leveling agents can be added to each of the layers with a view to preventing an increase in residual potential of the electrophotographic photosensitive body, and reductions in charged potential and sensitivity of the body due to the repeated use of the body.

Examples of the binder include a silicone resin, a polyamide resin, a polyurethane resin, a polyester resin, an epoxy resin, a polyketone resin, a polycarbonate resin, a polystyrene resin, a polymethacrylate resin, a polyacrylamide resin, a polybutadiene resin, a polyisoprene resin, a melamine resin, a benzoguanamine resin, a polychloroprene resin, a polyacrylonitrile resin, an ethylcellulose resin, a nitrocellulose resin, a urea resin, a phenol resin, a phenoxy resin, a polyvinylbutylal resin, a formal resin, a vinyl acetate resin, a vinyl acetate/vinyl chloride copolymer resin, and a polyester carbonate resin. In addition, a heat curable resin and/or a photocurable resin can also be used. Such resin is not particularly limited as long as the resin has electrical insulating property and can be formed into a coating film in an ordinary state, and the effect of the present invention is not impaired.

Specific examples of the plasticizer include biphenyl, biphenyl chloride, o-terphenyl, paraffin halide, dimethyl naphthalene, dimethyl phthalate, dibutyl phthalate, dioctyl phthalate, diethyleneglycol phthalate, triphenyl phosphate, diisobutyl adipate, dimethyl sebacate, dibutyl sebacate, butyl laurate, methylphthalylethyl glycolate, dimethylglycol phthalate, methyl naphthalene, benzophenone, polypropyrene, polystyrene, and fluorohydrocarbons.

Specific examples of the curing catalyst include methanesulfonic acid, dodecylbenzenesulfonic acid, and dinonylnaphthalenedisulfonic acid. Specific examples of the fluidity imparting agent include a MODAFLOW and an ACRONAL 4F. Specific examples of the pinhole controlling agent include benzoin and dimethylphthalate. Each of the plasticizer, the curing catalyst, the fluidity imparting agent, and the pinhole controlling agent is preferably used at a content of 5 mass % or less with respect to the charge transport layer.

In addition, when a sensitizing dye is used, suitable examples of the spectral sensitizer include: triphenylmethane dyes such as methyl violet, crystal violet, night blue, and Victoria blue; acridine dyes such as erythrosine, rhodamine B, rhodamine 3R, acridine orange, and flapeosine; thiazine dyes such as methylene blue and methylene green; oxazine dyes such as capri blue and Meldola's blue; cyanine dyes; merocyanine dyes; styryl dyes; pyrylium salt dyes; and thiopyrylium salt dyes.

An electron accepting substance can be added to the photosensitive layer for the purposes of, for example, improving the sensitivity of the layer, reducing the residual potential of the layer, and reducing the fatigue of the layer due to the repeated use. Preferred specific examples thereof include compounds having large electron affinity such as succinic anhydride, maleic anhydride, dibromomaleic anhydride, phthalic anhydride, tetrachlorophtahalic anhydride, tetrabromophthalic anhydride, 3-nitrophthalic anhydride, 4-nitrophthalic anhydride, pyromellitic anhydride, mellitic anhydride, tetracyanoethylene, tetracyanoquinodimethane, o-dinitrobenzene, m-dinitrobenzene, 1,3,5-trinitrobenzene, p-nitrobenzonitrile, picryl chloride, quinonechlorimide, chloranil, bromanil, benzoquinone, 2,3-dichlorobenzoquinone, dichlorodicyano-p-benzoquinone, naphthoquinone, diphenoquinone, tropoquinone, anthraquinone, 1-chloroanthraquinone, dinitroanthraquinone, 4-nitrobenzophenone, 4,4'-dinitrobenzophenone, 4-nitrobenzalmalondinitrile, ethyl α-cyano-β-(p-cyanophenyl)acrylate, 9-anthracenylmethylmalondinitrile, 1-cyano-(p-nitrophenyl)-2-(p-chlorophenyl)ethylene, 2,7-dinitrofluorenone, 2,4,7-trinitrofluorenone, 2,4,5,7-tetranitrofluorenone, 9-fluorenylidene-(dicyanomethylenemalononitrile), polynitro-9-fluorenylidene-(dicyanomethylenemalonodinitrile), picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid, and mellitic acid. Each of those compounds may be added to each of the charge generation layer and the charge transport layer, and is added at a compounding ratio of generally from about 0.01 to 200 parts by mass, preferably from 0.1 to 50 parts by mass with respect to 100 parts by mass of the charge generation material or the charge transport material.

In addition, a tetrafluoroethylene resin, a trifluorochloroethylene resin, a tetrafluoroethylene-hexafluoropropylene resin, a vinyl fluoride resin, a vinylidene fluoride resin, or a difluorodichloroethylene resin, or a copolymer of two or more thereof or a fluorine-based graft polymer of each thereof may be used for improving the surface property. Such surface modifier is added at a blending ratio of generally from about 0.1 to 60 mass %, preferably from 5 to 40 mass % with respect to the binder resin. When the blending ratio is less than 0.1 mass %, a surface modifying effect such as an improvement in surface durability or a reduction in surface energy is not sufficient. When the blending ratio is more than 60 mass %, the electrophotographic characteristics may decrease.

Preferred examples of the antioxidants include a hindered phenol antioxidant, an aromatic amine antioxidant, a hindered amine antioxidant, a sulfide antioxidant, and an organophosphorus antioxidant. Such antioxidant is added at a blending ratio of generally from 0.01 to 10 mass %, preferably from 0.1 to 2 mass % with respect to the charge transport material.

Suitable specific examples of the antioxidants include compounds of the chemical formulae ([Chem. 94] to [Chem. 101]) described in the specification of JP 11-172003 A.

One of those antioxidants may be used alone, or two or more thereof may be used as a mixture. In addition, each of those antioxidants may be added to each of the surface protective layer, the undercoat layer, and the blocking layer as well as the photosensitive layer.

Specific examples of the solvent to be used in the formation of each of the charge generation layer and the charge transport layer include: aromatic solvents such as benzene, toluene, xylene, and chlorobenzene; ketones such as acetone, methyl ethyl ketone, and cyclohexanone; alcohols such as methanol, ethanol, and isopropanol; esters such as ethyl acetate and ethyl cellosolve; halogenated hydrocarbons such as carbon tetrachloride, carbon tetrabromide, chloroform, dichloromethane, and tetrachloroethane; ethers such as tetrahydrofuran, dioxolane, and dioxane; dimethylformamide; dimethylsulfoxide; and diethylformamide. One of those solvents may be used alone, or two or more thereof may be used as a mixed solvent.

The photosensitive layer of the monolayer electrophotographic photosensitive body can be easily formed with the charge generation material, the charge transport material, and the additive by applying the PC copolymer of the present invention. In addition, the hole transport material and/or the electron transport material described above are each/is preferably added as the charge transport material. A substance given in JP 2005-139339 A is preferably applicable as the electron transport material.

The application of each layer can be performed by using any various known applicators. Specifically, the application can be performed by using, for example, an applicator, a spray coater, a bar coater, a chip coater, a roll coater, a dip coater, a doctor blade, or the like.

The photosensitive layer of the electrophotographic photosensitive body has a thickness of generally from 5 to 100 μm, preferably from 8 to 50 μm. When the thickness is less than 5 μm, the initial potential is liable to decrease. When the thickness exceeds 100 μm, the electrophotographic characteristics may decrease. A ratio between the charge generation material and the binder resin to be used in the production of the electrophotographic photosensitive body is generally from 1:99 to 30:70, preferably from 3:97 to 15:85 in terms of a mass ratio. In addition, a ratio between the charge transport material and the binder resin is from 10:90 to 80:20, preferably from 30:70 to 70:30 in terms of a mass ratio.

The electrophotographic photosensitive body of the present invention thus obtained uses the PC copolymer of the present invention, and hence the coating liquid does not become cloudy and does cause gelling when the photosensitive layer is produced. In addition, the electrophotographic photosensitive body contains a molded body (binder resin) formed of the PC copolymer of the present invention in the photosensitive layer, and hence is excellent in durability (scratch resistance) and has an excellent electrical characteristic (charging characteristic). Accordingly, the electrophotographic photosensitive body of the present invention is a photosensitive body maintaining excellent electrophotographic characteristics for a long time period, and suitably finds use in a variety of electrophotographic fields such as copying machines (monochromatic, multi-color, or full-color; analog or digital copying machines), printers (laser, LED, or liquid crystal shutter printers), facsimiles, plate makers, and devices each having a plurality of those functions.

It should be noted that upon use of the electrophotographic photosensitive body of the present invention, corona discharge (corotron or scorotron), contact charging (charging roll or charging brush), or the like is employed for charging. Examples of the charging roll include ones of a DC charging type and a DC charging type on which AC is superimposed. In addition, anyone of a halogen lamp, a fluorescent lamp, laser (semiconductor laser or He—Ne laser), an LED, and an internal image exposure mode of photosensitive body may be adopted for exposure. A dry developing mode such as cascade development, two-component magnetic brush development, one-component insulating toner development, or one-component conductive toner development, or a wet developing mode is employed for development. An electrostatic image transfer such as corona transfer, roller transfer, or belt transfer, a pressure transfer, or an adhesive transfer is employed for transfer. Heat roller fixing, radiant flash fixing, open fixing, pressure fixing, or the like is employed for fixing. Further, a brush cleaner, a magnetic brush cleaner, an antistatic brush cleaner, a magnetic roller cleaner, a blade cleaner, one omitting a cleaner, or the like is used for cleaning and antistatic treatment. In addition, a styrene resin, a styrene-acrylic copolymer resin, polyester, an epoxy resin, a polymer of a cyclic hydrocarbon, or the like is applicable as a resin for toner. The shape of the toner may be spherical or amorphous, and the toner whose shape is controlled to a certain shape (such as a spheroidal shape or a potato shape) is also applicable. The toner may be any one of a pulverized toner, a suspension-polymerized toner, an emulsion-polymerized toner, a chemically granulated toner, and an ester extension toner.

EXAMPLES

Next, the present invention is described in more detail by way of Examples and Comparative Examples. However, the present invention is not limited by Examples below, and various modifications and applications are possible without departing from the spirit of the present invention.

Production Examples

Preparation of Oligomers

Production Example 1

Synthesis of Bisphenol Z Oligomer
(Bischloroformate Oligomer)

56.6 kg (224 mol) of 1,1-bis(4-hydroxyphenyl)cyclohexane (bisphenol Z) were suspended in 1,080 L of methylene chloride, and 66.0 kg (667 mol) of phosgene were added to and dissolved in the suspension. A liquid obtained by dissolving 44.0 kg (435 mol) of triethylamine in 120 L of methylene chloride was dropped to the solution at from 2.2 to 17.8° C. over 2 hours and 50 minutes. After the mixture had been stirred at from 17.9° C. to 19.6° C. for 30 minutes, 900 L of methylene chloride were removed by distillation at from 14 to 20° C. 210 L of pure water, 1.2 kg of concentrated hydrochloric acid, and 450 g of sodium hydrosulfite were added to the remaining liquid to wash the liquid. After that, washing with 210 L of pure water was repeated five times to provide a methylene chloride solution of a bisphenol Z oligomer having a chloroformate group at a molecular terminal thereof. The resultant solution had a chloroformate concentration of 1.14 mol/L, a solid matter concentration of 0.22 kg/L, and an average repeating number of monomer unit of 1.02. The resultant raw material is hereinafter referred to as "Z-CF".

It should be noted that the average repeating number of monomer unit n' was determined by using the following mathematical equations (eq. 1) to (eq. 4).

Average repeating number of monomer unit $n'=1+$[oligomer average molecular weight $Mav-$ monomer molecular weight $M1$]/repeating unit molecular weight $M2$       (eq. 1)

Oligomer average molecular weight Mav=oligomer
mass concentration(=solid matter concentration×
1,000, g/L)/oligomer molar concentration (mol/
L)  (eq. 2)

Oligomer molar concentration (mol/L)=chlorofor-
mate group molar concentration (mol/L)/2  (eq. 3)

Repeating unit molecular weight M2=M1−98.92  (eq. 4)

Here, M1 represents the molecular weight of the component A when n'=1 in the general formula (I), the chloroformate group molar concentration (mol/L) refers to the number of moles of a chloroformate group in the component A in 1 L of the reaction solution, and the oligomer mass concentration (kg/L) refers to a value determined from the concentration of solid matter obtained by concentrating 1 L of the reaction solution.

It should be noted that the value "98.92" is the total of the atomic weights of 2 chlorine atoms, 1 oxygen atom, and 1 carbon atom corresponding to a difference between the monomer and the repeating unit.

Production Example 2

Synthesis of Bisphenol E Oligomer
(Bischloroformate)

73.0 g (0.341 mol) of 1,1-bis(4-hydroxyphenyl)ethane (bisphenol E) were suspended in 410 mL of methylene chloride, and 68.7 g (0.682 mol) of triethylamine were added to and dissolved in the suspension. The solution was dropped to a liquid obtained by dissolving 65.0 g (0.689 mol) of phosgene in 245 mL of methylene chloride at from 14 to 18.5° C. over 2 hours and 50 minutes. After the mixture had been stirred at from 18.5° C. to 19° C. for 1 hour, 250 mL of methylene chloride were removed by distillation at from 10 to 22° C. 73 mL of pure water, 4.5 mL of concentrated hydrochloric acid, and 0.47 g of sodium hydrosulfite were added to the remaining liquid to wash the liquid. After that, washing with 330 mL of pure water was repeated four times to provide a methylene chloride solution of a bisphenol E oligomer having a chloroformate group at a molecular terminal thereof. The resultant solution had a chloroformate concentration of 0.98 mol/L, a solid matter concentration of 0.21 kg/L, and an average repeating number of monomer unit of 1.37. The resultant raw material is hereinafter referred to as "E-CF".

Production Example 3

Synthesis of Bisphenol CZ Oligomer
(Bischloroformate)

A solution obtained by diluting 199.4 g (1.97 mol) of triethylamine with 460 ml of methylene chloride was dropped to a mixed liquid of 266 g (0.897 mol) of 1,1-bis(3-methyl-4-hydroxyphenyl)cyclohexane (bisphenol CZ), 1,058 ml of methylene chloride, and 187 g (1.89 mol) of phosgene at from 13 to 16° C. over 3 hours and 6 minutes. The reaction mixture was stirred at from 14 to 16° C. for 1 hour and 38 minutes. 5.0 mL of concentrated hydrochloric acid and 200 ml of pure water were added to the reaction mixture to wash the mixture. After that, water washing was repeated until an aqueous layer became neutral. Thus, a methylene chloride solution of a bisphenol CZ oligomer having a chloroformate group at a molecular terminal thereof was obtained.

The resultant solution had a chloroformate concentration of 1.01 mol/L, a solid matter concentration of 0.22 kg/L, and an average repeating number of monomer unit of 1.10. The resultant raw material is hereinafter referred to as "CZ-CF".

Production Example 4

Synthesis of Bisphenol B Oligomer
(Bischloroformate)

The same operations as those of Production Example 2 were performed except that a solution obtained by diluting 200.8 g (1.98 mol) of triethylamine with 460 ml of methylene chloride was dropped to a mixed liquid of 210 g (0.867 mol) of 2,2-bis(4-hydroxyphenyl) butane (bisphenol B), 1,058 ml of methylene chloride, and 183 g (1.85 mol) of phosgene. Thus, a methylene chloride solution of a bisphenol B oligomer having a chloroformate group at a molecular terminal thereof was obtained.

The resultant solution had a chloroformate concentration of 1.16 mol/L, a solid matter concentration of 0.24 kg/L, and an average repeating number of monomer unit of 1.08. The resultant raw material is hereinafter referred to as "B-CF".

Example 1

Production of PC Copolymer

The Z-CF (146 mL) of Production Example 1 and methylene chloride (217 mL) were charged into a reaction vessel equipped with a mechanical stirrer, a stirring blade, and a baffle board. p-tert-Butylphenol (hereinafter referred to as "PTBP") (0.254 g) as a chain-end terminator and 3.84 g of 2,2'-dimethylbiphenyl-4,4'-diamine (2,2'-dimethylbenzidine) as a monomer were added to the mixture, and the contents were stirred so as to be sufficiently mixed. After a temperature in the reaction vessel had been cooled to 15° C., 11 mL of a 1.5 N aqueous solution of potassium carbonate (5.24 g of potassium carbonate) were added to the solution. While the mixture was further stirred, 1.2 mL of an aqueous solution (7 vol %) of triethylamine were added to the mixture and the whole was stirred for 15 minutes. After that, a total amount of a 4,4'-biphenol monomer solution separately prepared was added to the solution (4,4'-biphenol monomer solution preparation method: 93 mL of a 2.3 N aqueous solution of sodium hydroxide (9.11 g of sodium hydroxide) were prepared and cooled to room temperature or less, and then 0.1 g of sodium hydrosulfite as an antioxidant and 12.2 g of 4,4'-biphenol were added to and completely dissolved in the solution to prepare the 4,4'-biphenol monomer solution), and the mixture was further stirred for 1 hour.

The resultant reaction mixture was diluted and washed with 0.2 L of methylene chloride and 0.1 L of water. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-1) having the following structure.

Identification of PC Copolymer

The PC copolymer (PC-1) thus obtained was dissolved in methylene chloride to prepare a solution having a concentration of 0.5 g/dl and its reduced viscosity [$\eta_{sp}$/C] at 20° C.

was measured. As a result, the viscosity was 1.10 dl/g. It should be noted that the analysis of the structure and composition of the resultant PC-1 with a $^1$H-NMR spectrum and a $^{13}$C-NMR spectrum confirmed that the PC copolymer had the following repeating units, repeating unit number, and composition.

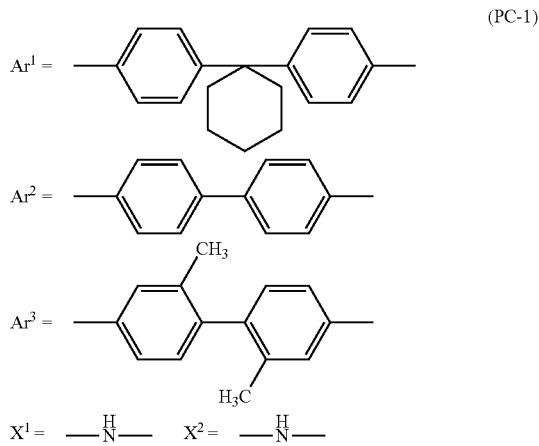

(PC-1)

$n=1.44$ $Ar^1/(Ar^1+Ar^2+Ar^3)=0.59$ $Ar^2/(Ar^1+Ar^2+Ar^3)=0.33$ $Ar^3/(Ar^1+Ar^2+Ar^3)=0.08$

It should be noted that the structure in the formula (1) was identified by the following procedure. First, the presence ratios of $Ar^1$, $Ar^2$, and $Ar^3$ were calculated with the $^1$H-NMR spectrum.

Next, the $^{13}$C-NMR spectrum was used to confirm that neither a bond between the repeating units B nor a bond between the repeating units C existed.

The average repeating number of monomer unit n in the repeating unit A was calculated from the following calculation equation on the assumption that $Ar^2$ and $Ar^3$ were of the same structure $Ar^4$ while $Ar^4$ was defined as a monomer.

$Ar^1/(Ar^1+Ar^2+Ar^3)=Ar^1/(Ar^1+Ar^4)=n/(n+1)$ (eq. 5)

Production of Coating Liquid and Electrophotographic Photosensitive Body

A polyethylene terephthalate resin film onto which an aluminum metal had been deposited from the vapor was used as a conductive substrate, and a charge generation layer and a charge transport layer were sequentially laminated on the surface of the film to form a laminated photosensitive layer. Thus, an electrophotographic photosensitive body was produced. 0.5 Parts by mass of oxotitanium phthalocyanine was used as a charge generation material and 0.5 parts by mass of a butyral resin was used as a binder resin. The substance and the resin were added to 19 parts by mass of methylene chloride as a solvent, followed by dispersion with a ball mill. The surface of the conductive substrate film was coated with the dispersion liquid by using a bar coater, and the liquid was dried to form a charge generation layer having a thickness of about 0.5 micron.

Next, 0.5 g of a compound (CTM-1) represented by the following formula (23) as a charge transport material and 0.5 g of the polycarbonate copolymer (PC-1) obtained in the foregoing were dispersed in 10 milliliters of tetrahydrofuran to prepare a coating liquid. The coating liquid was applied onto the charge generation layer with an applicator and dried to form a charge transport layer having a thickness of about 20 microns.

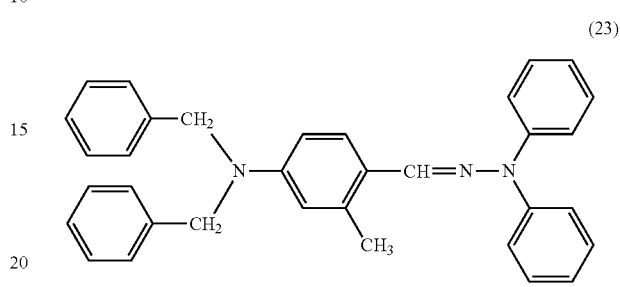

(23)

Evaluations of PC Copolymer and Electrophotographic Photosensitive Body

The PC copolymer was evaluated for its solubility by visually observing, at the time of the preparation of the coating liquid, the turbidity of the prepared coating liquid. The case where the PC copolymer dissolved and no turbidity was observed was evaluated as A, the case where an undissolved portion existed was evaluated as X, and the case where the turbid coating liquid was evaluated as "turbidity".

In addition, the evaluation of each of the PC copolymer and the electrophotographic photosensitive body for its abrasion resistance was performed as described below.

[1] Production of sample for evaluation of copolymer for its abrasion resistance: The PC-1 (2 g) was dissolved in methylene chloride (12 mL) and the solution was cast on a commercial PET film with an applicator to form a film. The solvent was removed by heating the film under reduced pressure. Thus, a film sample having a thickness of about 30 μm was obtained.

[2] Production of sample for evaluation of photosensitive body for its abrasion resistance: The PC-1 (1 g) and the CTM-1 (1 g) were dissolved in methylene chloride (10 mL), and the solution was cast on a commercial PET film with an applicator to form a film. The solvent was removed by heating the film under reduced pressure. Thus, a film sample having a thickness of about 30 μm was obtained.

[3] Evaluation: The cast surface of each of the films produced in the sections [1] and [2] was evaluated for its abrasion resistance with a Suga Abrasion Tester Model NUS-ISO-3 (manufactured by Suga Test Instruments Co., Ltd.). Test conditions were as described below. Abrasive paper (containing alumina particles each having a particle diameter of 3 μm) under a load of 4.9 N was brought into contact with the surface of the photosensitive layer and reciprocated 2,000 times, followed by the measurement of a mass reduction amount.

Next, the electrophotographic characteristics of the electrophotographic photosensitive body were measured with an electrostatic paper analyzer EPA-8100 (manufactured by Kawaguchi Electric Works). Its initial surface potential ($V_0$), residual potential (initial residual potential ($V_R$)) 5 seconds after photoirradiation (10 Lux), and half decay exposure ($E_{1/2}$) were measured by performing corona charging according to a static mode at −6 kV. In addition, a commercial printer (FS-600 manufactured by KYOCERA Corporation) was reconstructed so that the surface potential of the photosensitive body could be measured, and the photosensitive body formed in the drum shape could be mounted and evaluated. The photosensitive body was evaluated for its charging characteristics (residual potential after repeated use increase ($V_R$ increase)) before and after 24 hours of repeated operation under high-temperature and high-humidity conditions (35° C., 85%), and under such a condition that none of toner and paper was passed.

Table 1 shows the results. The same evaluations were also performed in Examples 2 to 10 and Comparative Examples 1 to 3 to be described later. Table 1 shows the results.

Example 2

The Z-CF (146 mL) of Production Example 1 and methylene chloride (217 mL) were charged into a reaction vessel equipped with a mechanical stirrer, a stirring blade, and a baffle board. p-tert-Butylphenol (hereinafter referred to as "PTBP") (0.247 g) as a chain-end terminator and 3.61 g of 4,4'-diaminodiphenyl ether as a monomer were added to the mixture, and the contents were stirred so as to be sufficiently mixed. After a temperature in the reaction vessel had been cooled to 15° C., 11 mL of a 1.5 N aqueous solution of potassium carbonate (5.24 g of potassium carbonate) were added to the solution. While the mixture was further stirred, 1.2 mL of an aqueous solution (7 vol %) of triethylamine were added to the mixture and the whole was stirred for 15 minutes. After that, a total amount of a 4,4'-biphenol monomer solution separately prepared was added to the solution (4,4'-biphenol monomer solution preparation method: 93 mL of a 2.3 N aqueous solution of sodium hydroxide (9.11 g of sodium hydroxide) were prepared and cooled to room temperature or less, and then 0.1 g of sodium hydrosulfite as an antioxidant and 12.2 g of 4,4'-biphenol were added to and completely dissolved in the solution to prepare the 4,4'-biphenol monomer solution), and the mixture was further stirred for 1 hour.

The resultant reaction mixture was diluted and washed with 0.2 L of methylene chloride and 0.1 L of water. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-2) having the following structure.

The PC-2 had a reduced viscosity [$\eta_{sp}/C$] of 1.13 dl/g, and it was confirmed from the calculation equation (eq. 5) that the PC copolymer was of a structure composed of the following repeating units and composition. It was also confirmed that neither a bond between the repeating units B nor a bond between the repeating units C existed.

(PC-2)

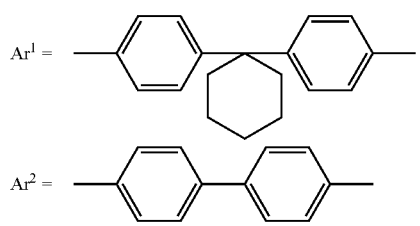

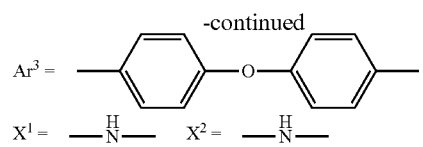

$X^1 =$ —$\overset{H}{N}$— $X^2 =$ —$\overset{H}{N}$—

$n=1.44$ $Ar^1/(Ar^1+Ar^2+Ar^3)=0.59$ $Ar^2/(Ar^1+Ar^2+Ar^3)=0.32$ $Ar^3/(Ar^1+Ar^2+Ar^3)=0.09$

Example 3

The Z-CF (146 mL) of Production Example 1 and methylene chloride (217 mL) were charged into a reaction vessel equipped with a mechanical stirrer, a stirring blade, and a baffle board. p-tert-Butylphenol (hereinafter referred to as "PTBP") (0.332 g) as a chain-end terminator and 1.86 g of 2,2'-dimethylbenzidine as a monomer were added to the mixture, and the contents were stirred so as to be sufficiently mixed. After a temperature in the reaction vessel had been cooled to 15° C., 11 mL of a 1.5 N aqueous solution of potassium carbonate (5.24 g of potassium carbonate) were added to the solution. While the mixture was further stirred, 1.2 mL of an aqueous solution (7 vol %) of triethylamine were added to the mixture and the whole was stirred for 15 minutes. After that, a total amount of a 3,3'-dimethyl-4,4'-biphenol monomer solution separately prepared was added to the solution (3,3'-dimethyl-4,4'-biphenol solution preparation method: 93 mL of a 2.3 N aqueous solution of sodium hydroxide (9.11 g of sodium hydroxide) were prepared and cooled to room temperature or less, and then 0.1 g of sodium hydrosulfite as an antioxidant and 16.0 g of 3,3'-dimethyl-4,4'-biphenol were added to and completely dissolved in the solution to prepare the 3,3'-dimethyl-4,4'-biphenol solution), and the mixture was further stirred for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-3) having the following structure.

The PC-3 had a reduced viscosity [$\eta_{sp}/C$] of 1.13 dl/g, and it was confirmed from the calculation equation (eq. 5) that the PC copolymer was of a structure composed of the following repeating units and composition. It was also confirmed that neither a bond between the repeating units B nor a bond between the repeating units C existed.

(PC-3)

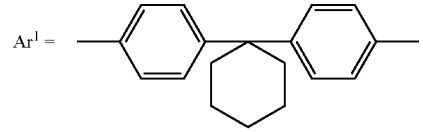

-continued

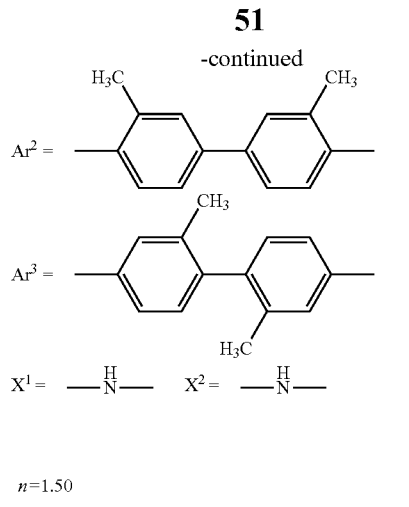

$X^1 = $ —$\overset{H}{N}$— $X^2 = $ —$\overset{H}{N}$— n=1.50

Ar$^1$/(Ar$^1$+Ar$^2$+Ar$^3$)=0.60

Ar$^2$/(Ar$^1$+Ar$^2$+Ar$^3$)=0.35

Ar$^3$/(Ar$^1$+Ar$^2$+Ar$^3$)=0.05

Example 4

The Z-CF (146 mL) of Production Example 1 and methylene chloride (217 mL) were charged into a reaction vessel equipped with a mechanical stirrer, a stirring blade, and a baffle board. p-tert-Butylphenol (hereinafter referred to as "PTBP") (0.268 g) as a chain-end terminator and 6.30 g of 9,9'-bis(4-aminophenyl) fluorene as a monomer were added to the mixture, and the contents were stirred so as to be sufficiently mixed. After a temperature in the reaction vessel had been cooled to 15° C., 11 mL of a 1.5 N aqueous solution of potassium carbonate (5.24 g of potassium carbonate) were added to the solution. While the mixture was further stirred, 1.2 mL of an aqueous solution (7 vol %) of triethylamine were added to the mixture and the whole was stirred for 15 minutes. After that, a total amount of a 4,4'-biphenol monomer solution separately prepared was added to the solution (4,4'-biphenol monomer solution preparation method: 93 mL of a 2.3 N aqueous solution of sodium hydroxide (9.11 g of sodium hydroxide) were prepared and cooled to room temperature or less, and then 0.1 g of sodium hydrosulfite as an antioxidant and 12.2 g of 4,4'-biphenol were added to and completely dissolved in the solution to prepare the 4,4'-biphenol monomer solution), and the mixture was further stirred for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-4) having the following structure.

The PC-4 had a reduced viscosity [$\eta_{sp}$/C] of 1.10 dl/g, and it was confirmed from the calculation equation (eq. 5) that the PC copolymer was of a structure composed of the following repeating units and composition. It was also confirmed that neither a bond between the repeating units B nor a bond between the repeating units C existed.

(PC-4)

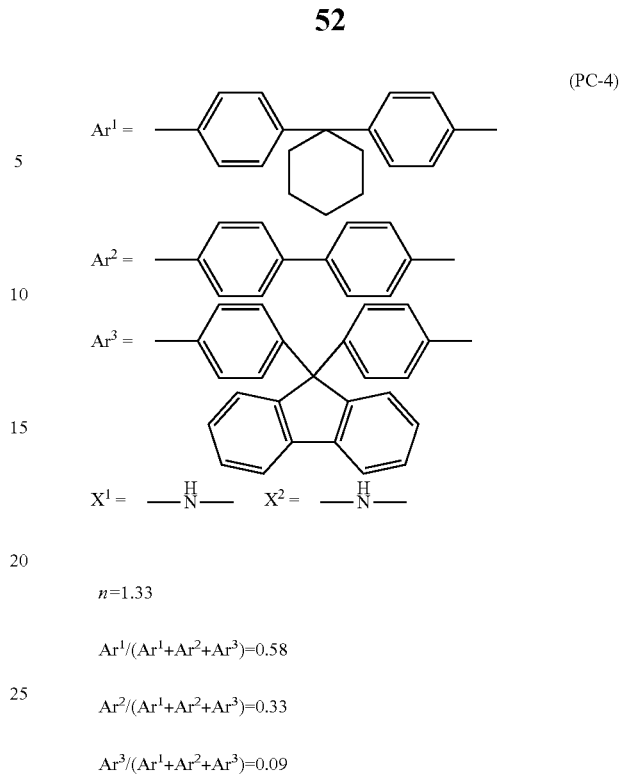

$X^1 = $ —$\overset{H}{N}$— $X^2 = $ —$\overset{H}{N}$— n=1.33

Ar$^1$/(Ar$^1$+Ar$^2$+Ar$^3$)=0.58

Ar$^2$/(Ar$^1$+Ar$^2$+Ar$^3$)=0.33

Ar$^3$/(Ar$^1$+Ar$^2$+Ar$^3$)=0.09

Example 5

The CZ-CF (165 mL) of Production Example 3 and methylene chloride (243 mL) were charged into a reaction vessel equipped with a mechanical stirrer, a stirring blade, and a baffle board. p-tert-Butylphenol (hereinafter referred to as "PTBP") (0.254 g) as a chain-end terminator and 3.61 g of 4,4'-diaminodiphenyl ether as a monomer were added to the mixture, and the contents were stirred so as to be sufficiently mixed. After a temperature in the reaction vessel had been cooled to 15° C., 11 mL of a 1.5 N aqueous solution of potassium carbonate (5.24 g of potassium carbonate) were added to the solution. While the mixture was further stirred, 1.2 mL of an aqueous solution (7 vol %) of triethylamine were added to the mixture and the whole was stirred for 15 minutes. After that, a total amount of a 4,4'-biphenol monomer solution separately prepared was added to the solution (4,4'-biphenol monomer solution preparation method: 93 mL of a 2.3 N aqueous solution of sodium hydroxide (9.11 g of sodium hydroxide) were prepared and cooled to room temperature or less, and then 0.1 g of sodium hydrosulfite as an antioxidant and 12.2 g of 4,4'-biphenol were added to and completely dissolved in the solution to prepare the 4,4'-biphenol monomer solution), and the mixture was further stirred for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-5) having the following structure.

The PC-5 had a reduced viscosity [$\eta_{sp}$/C] of 1.13 dl/g, and it was confirmed in the calculation equation (eq. 5) that the PC copolymer was of a structure composed of the following repeating units and composition. It was also confirmed that neither a bond between the repeating units B nor a bond between the repeating units C existed.

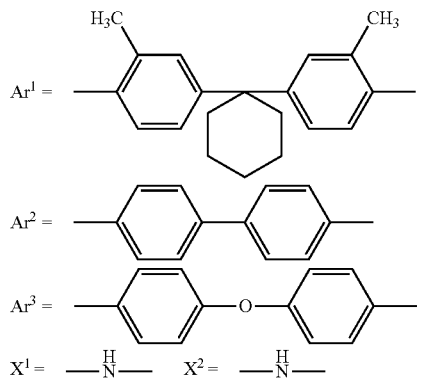

(PC-5)

$Ar^1/(Ar^1+Ar^2+Ar^3)=0.58$ $Ar^2/(Ar^1+Ar^2+Ar^3)=0.33$ $Ar^3/(Ar^1+Ar^2+Ar^3)=0.09$

Example 6

The Z-CF (66.3 mL) of Production Example 1 and methylene chloride (124 mL) were charged into a reaction vessel equipped with a mechanical stirrer, a stirring blade, and a baffle board. 1.7 g of terephthalic acid dichloride and p-tert-butylphenol (hereinafter referred to as "PTBP") (0.129 g) as a chain-end terminator were added to the mixture, and the contents were stirred so as to be sufficiently mixed. After a temperature in the reaction vessel had been cooled to 15° C., a total amount of a prepared 4,4'-biphenol monomer solution was added to the solution (4,4'-biphenol monomer solution preparation method: 66 mL of a 1.5 N aqueous solution of sodium hydroxide (4.08 g of sodium hydroxide) were prepared and cooled to room temperature or less, and then 0.1 g of sodium hydrosulfite as an antioxidant and 6.9 g of 4,4'-biphenol were added to and completely dissolved in the solution to prepare the 4,4'-biphenol monomer solution). While the mixture was stirred, 0.2 mL of an aqueous solution (7 vol %) of triethylamine was added to the mixture and the stirring was continued for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-6) having the following structure.

The PC-6 had a reduced viscosity [$\eta_{sp}$/C] of 1.03 dl/g, and it was confirmed in the measurement described above and calculation described below (eq. 6 and eq. 7) that the PC copolymer was of a structure composed of the following repeating units and composition. It was also confirmed that neither a bond between the repeating units B nor a bond between the repeating units C existed.

The average repeating number of monomer unit n in the repeating unit A was calculated from the following calculation equations (6) and (7) on the assumption that $Ar^1$ and $Ar^3$ were of the same structure $Ar^5$ while the average repeating number of monomer unit of $Ar^5$ was represented by n", and $Ar^2$ and $Ar^3$ were defined as monomers.

$$(Ar^1+Ar^3)/(Ar^1+Ar^2+Ar^3)=Ar^5/(Ar^5+Ar^2)=n''/(n''+1) \quad \text{(eq. 6)}$$

$$n''=(n+1)/2 \quad \text{(eq. 7)}$$

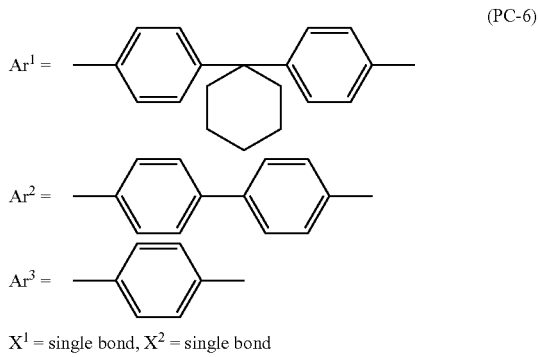

(PC-6)

$X^1$ = single bond, $X^2$ = single bond $n=2.70$ $Ar^1/(Ar^1+Ar^2+Ar^3)=0.59$ $Ar^2/(Ar^1+Ar^2+Ar^3)=0.35$ $Ar^3/(Ar^1+Ar^2+Ar^3)=0.06$ Example 7

The Z-CF (66.4 mL) of Production Example 1 and methylene chloride (127 mL) were charged into a reaction vessel equipped with a mechanical stirrer, a stirring blade, and a baffle board. 2.48 g of 4,4'-dibenzoyl oxychloride and p-tert-butylphenol (hereinafter referred to as "PTBP") (0.129 g) as a chain-end terminator were added to the mixture, and the contents were stirred so as to be sufficiently mixed. After a temperature in the reaction vessel had been cooled to 15° C., a total amount of a prepared 4,4'-biphenol monomer solution was added to the solution (4,4'-biphenol monomer solution preparation method: 66 mL of a 1.5 N aqueous solution of sodium hydroxide (4.08 g of sodium hydroxide) were prepared and cooled to room temperature or less, and then 0.1 g of sodium hydrosulfite as an antioxidant and 6.9 g of 4,4'-biphenol were added to and completely dissolved in the solution to prepare the 4,4'-biphenol monomer solution). While the mixture was stirred, 0.2 mL of an aqueous solution (7 vol %) of triethylamine was added to the mixture and the stirring was continued for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-7) having the following structure.

The PC-7 had a reduced viscosity [$\eta_{sp}$/C] of 1.05 dl/g, and it was confirmed from the calculation equations (eq. 6 and eq. 7) that the PC copolymer was of a structure composed of the following repeating units and composition. It was also confirmed that neither a bond between the repeating units B nor a bond between the repeating units C existed.

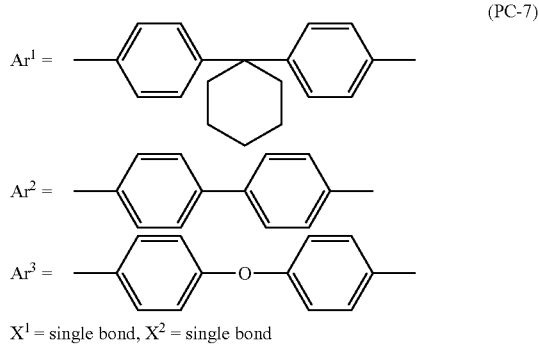

(PC-7)

$X^1$ = single bond, $X^2$ = single bond $n$=2.70

$Ar^1/(Ar^1+Ar^2+Ar^3)$=0.59

$Ar^2/(Ar^1+Ar^2+Ar^3)$=0.31

$Ar^3/(Ar^1+Ar^2+Ar^3)$=0.10

Example 8

The B-CF (56.3 mL) of Production Example 4 and methylene chloride (137 mL) were charged into a reaction vessel equipped with a mechanical stirrer, a stirring blade, and a baffle board. 2.87 g of 4,4'-oxybis(2-methylbenzoyl chloride) and p-tert-butylphenol (hereinafter referred to as "PTBP") (0.126 g) as a chain-end terminator were added to the mixture, and the contents were stirred so as to be sufficiently mixed. After a temperature in the reaction vessel had been cooled to 15° C., a total amount of a prepared 4,4'-biphenol monomer solution was added to the solution (4,4'-biphenol monomer solution preparation method: 66 mL of a 1.5 N aqueous solution of sodium hydroxide (4.07 g of sodium hydroxide) were prepared and cooled to room temperature or less, and then 0.1 g of sodium hydrosulfite as an antioxidant and 6.9 g of 4,4'-biphenol were added to and completely dissolved in the solution to prepare the 4,4'-biphenol monomer solution). While the mixture was stirred, 0.2 mL of an aqueous solution (7 vol %) of triethylamine was added to the mixture and the stirring was continued for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-8) having the following structure.

The PC-8 had a reduced viscosity [$\eta_{sp}$/C] of 1.04 dl/g, and it was confirmed from the calculation equations (eq. 6 and eq. 7) that the PC copolymer was of a structure composed of the following repeating units and composition. It was also confirmed that neither a bond between the repeating units B nor a bond between the repeating units C existed.

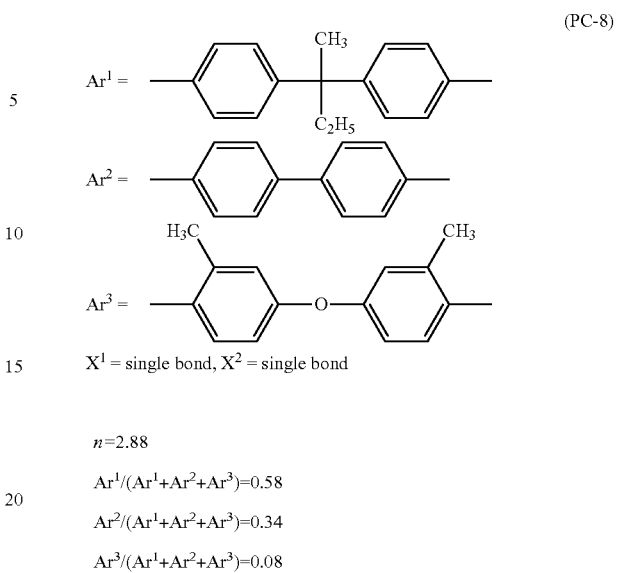

(PC-8)

$X^1$ = single bond, $X^2$ = single bond $n$=2.88

$Ar^1/(Ar^1+Ar^2+Ar^3)$=0.58

$Ar^2/(Ar^1+Ar^2+Ar^3)$=0.34

$Ar^3/(Ar^1+Ar^2+Ar^3)$=0.08

Example 9

The E-CF (66.4 mL) of Production Example 2 and methylene chloride (133 mL) were charged into a reaction vessel equipped with a mechanical stirrer, a stirring blade, and a baffle board. 2.69 g of 4,4'-dibenzoyl oxychloride and p-tert-butylphenol (hereinafter referred to as "PTBP") (0.122 g) as a chain-end terminator were added to the mixture, and the contents were stirred so as to be sufficiently mixed. After a temperature in the reaction vessel had been cooled to 15° C., a total amount of a prepared 4,4'-biphenol monomer solution was added to the solution (4,4'-biphenol monomer solution preparation method: 66 mL of a 1.5 N aqueous solution of sodium hydroxide (4.08 g of sodium hydroxide) were prepared and cooled to room temperature or less, and then 0.1 g of sodium hydrosulfite as an antioxidant and 6.9 g of 4,4'-biphenol were added to and completely dissolved in the solution to prepare the 4,4'-biphenol monomer solution). While the mixture was stirred, 0.2 mL of an aqueous solution (7 vol %) of triethylamine was added to the mixture and the stirring was continued for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-9) having the following structure.

The PC-9 had a reduced viscosity [$\eta_{sp}$/C] of 1.10 dl/g, and it was confirmed from the calculation equations (eq. 6 and eq. 7) that the PC copolymer was of a structure composed of the following repeating units and composition. It was also confirmed that neither a bond between the repeating units B nor a bond between the repeating units C existed.

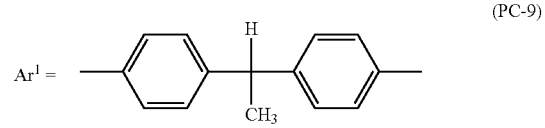

(PC-9)

-continued $Ar^2 =$ 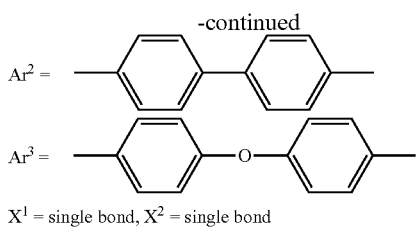

$Ar^3 =$ $X^1$ = single bond, $X^2$ = single bond $n=2.88$ $Ar^1/(Ar^1+Ar^2+Ar^3)=0.59$ $Ar^2/(Ar^1+Ar^2+Ar^3)=0.34$ $Ar^3/(Ar^1+Ar^2+Ar^3)=0.07$ Example 10

The Z-CF2 (66.4 mL) of Production Example 1 and methylene chloride (133 mL) were charged into a reaction vessel equipped with a mechanical stirrer, a stirring blade, and a baffle board. 1.7 g of terephthalic acid dichloride and p-tert-butylphenol (hereinafter referred to as "PTBP") (0.122 g) as a chain-end terminator were added to the mixture, and the contents were stirred so as to be sufficiently mixed. After a temperature in the reaction vessel had been cooled to 15° C., a total amount of a prepared 4,4'-dihydroxydiphenyl ether solution was added to the solution (4,4'-dihydroxydiphenyl ether solution preparation method: 66 mL of a 1.5 N aqueous solution of sodium hydroxide (4.08 g of sodium hydroxide) were prepared and cooled to room temperature or less, and then 0.1 g of sodium hydrosulfite as an antioxidant and 7.6 g of 4,4'-dihydroxydiphenyl ether were added to and completely dissolved in the solution to prepare the 4,4'-dihydroxydiphenyl ether solution). While the mixture was stirred, 0.2 mL of an aqueous solution (7 vol %) of triethylamine was added to the mixture and the stirring was continued for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-10) having the following structure.

The PC-10 had a reduced viscosity $[\eta_{sp}/C]$ of 1.11 dl/g, and it was confirmed from the calculation equations (eq. 6 and eq. 7) that the PC copolymer was of a structure composed of the following repeating units and composition. It was also confirmed that neither a bond between the repeating units B nor a bond between the repeating units C existed.

(PC-10)

$Ar^1 =$ 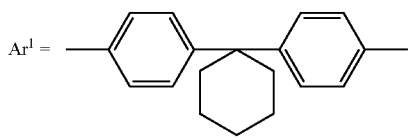

-continued $Ar^2 =$ 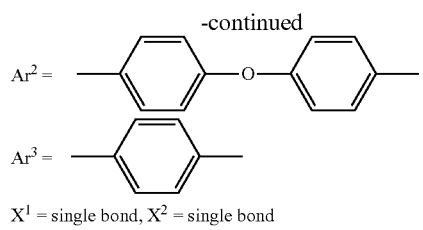

$Ar^3 =$ $X^1$ = single bond, $X^2$ = single bond $n=2.26$ $Ar^1/(Ar^1+Ar^2+Ar^3)=0.55$ $Ar^2/(Ar^1+Ar^2+Ar^3)=0.38$ $Ar^3/(Ar^1+Ar^2+Ar^3)=0.07$ Example 11

The CZ-CF (69 mL) of Production Example 3 and methylene chloride (133 mL) were charged into a reaction vessel equipped with a mechanical stirrer, a stirring blade, and a baffle board. 1.00 g of 4,4'-dibenzoyl oxychloride and p-tert-butylphenol (hereinafter referred to as "PTBP") (0.105 g) as a chain-end terminator were added to the mixture, and the contents were stirred so as to be sufficiently mixed. After a temperature in the reaction vessel had been cooled to 15° C., a total amount of a prepared 4,4'-biphenol monomer solution was added to the solution (4,4'-biphenol monomer solution preparation method: 66 mL of a 1.5 N aqueous solution of sodium hydroxide (4.32 g of sodium hydroxide) were prepared and cooled to room temperature or less, and then 0.1 g of sodium hydrosulfite as an antioxidant and 6.96 g of 4,4'-biphenol were added to and completely dissolved in the solution to prepare the 4,4'-biphenol monomer solution). While the mixture was stirred, 0.2 mL of an aqueous solution (7 vol %) of triethylamine was added to the mixture and the stirring was continued for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-9) having the following structure.

The PC-9 had a reduced viscosity $[\eta_{SP}/C]$ of 1.10 dl/g, and it was confirmed from the calculation equations (eq. 6 and eq. 7) that the PC copolymer was of a structure composed of the following repeating units and composition. It was also confirmed that neither a bond between the repeating units B nor a bond between the repeating units C existed.

$Ar^1 =$ 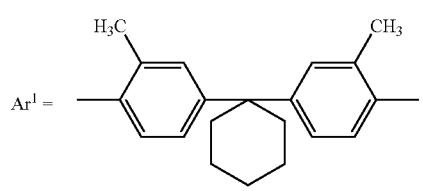

-continued $Ar^2 =$ 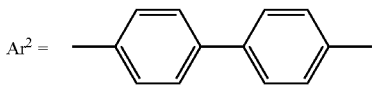

-continued $Ar^3 =$ 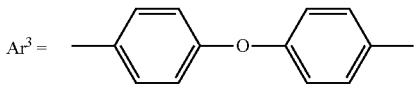

$X^1$ = single bond, $X^2$ = single bond $n = 2.40$ $Ar^1/(Ar^1+Ar^2+Ar^3) = 0.59$ $Ar^2/(Ar^1+Ar^2+Ar^3) = 0.37$ $Ar^3/(Ar^1+Ar^2+Ar^3) = 0.04$ Comparative Example 1

The Z-CF (157 mL) of Production Example 1 and methylene chloride (227 mL) were charged into a reaction vessel equipped with a mechanical stirrer, a stirring blade, and a baffle board. PTBP (0.336 g) as a chain-end terminator was added to the mixture, and the contents were stirred so as to be sufficiently mixed. After a temperature in the reaction vessel had been cooled to 15° C., a total amount of a prepared 4,4'-dihydroxydiphenyl ether solution was added to the solution (4,4'-dihydroxydiphenyl ether solution preparation method: 135 mL of a 1.5 N aqueous solution of sodium hydroxide (11.1 g of sodium hydroxide) were prepared and cooled to room temperature or less, and then 0.1 g of sodium hydrosulfite as an antioxidant and 7.6 g of 4,4'-dihydroxydiphenyl ether were added to and completely dissolved in the solution to prepare the 4,4'-dihydroxydiphenyl ether solution). While the mixture was stirred, 0.2 mL of an aqueous solution (7 vol %) of triethylamine was added to the mixture and the stirring was continued for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-10) having the following structure.

The PC-10 had a reduced viscosity $[\eta_{sp}/C]$ of 1.11 dl/g, and it was confirmed from NMR that the PC copolymer was of a structure composed of the following repeating unit and composition.

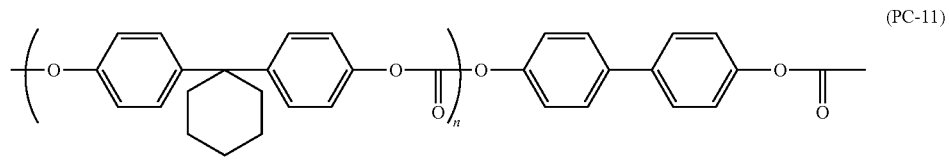

(PC-11)

$n = 1.54$ $Ar^1/(Ar^1+Ar^2) = 0.61$

Comparative Example 2

A PC copolymer (PC-12) was produced in accordance with the production method of Example 9 described in WO 2010-150885 A1 as described below.

A solution obtained by dissolving 0.2 kg of 1,1-bis(4-hydroxyphenyl)cyclohexane in 1.2 kg of a 16-mass % aqueous solution of potassium hydroxide was mixed with 1.3 kg of methylene chloride. While the mixed liquid was stirred, a phosgene gas was blown into the liquid at a rate of 1 L/min under cooling until the pH of the liquid became 9 or less. Next, the reaction liquid was left at rest and separated to provide a methylene chloride solution of a CF group-containing PC oligomer having a polymerization degree of from 2 to 6 (chloroformate group concentration=0.5 mol/L, solid matter concentration=0.26 kg/L). The chloroformate group concentration was determined by hydrolyzing the resultant CF group-containing PC oligomer and titrating eliminated chlorine.

3.7 g of 4,4'-diaminodiphenyl ether were dissolved in 100 ml of methylene chloride and 0.038 g of p-tert-butylphenol as a molecular weight modifier was added to the solution. After that, the solution was mixed with 110 ml of the methylene chloride solution of the oligomer and 43 ml of a 2-mol/L aqueous solution of potassium carbonate. Next, 1 ml of a 7-mass % aqueous solution of triethylamine was added as a catalyst to the mixed liquid while the liquid was vigorously stirred, followed by a reaction at 22° C. under stirring for 1.5 hours. After the completion of the reaction, the reaction product was diluted with 300 ml of methylene chloride, and was then washed with 100 ml of water once, 100 ml of 0.01-mol/L hydrochloric acid once, and 100 ml of water three times in the stated order. After that, an organic layer was charged into methanol and subjected to reprecipitation purification to provide a polycarbonate (PC-12) having the following structure.

The PC-12 had a reduced viscosity $[\eta_{sp}/C]$ of 1.07 dl/g, and it was confirmed from NMR that the PC copolymer was of a structure composed of the following repeating unit and composition.

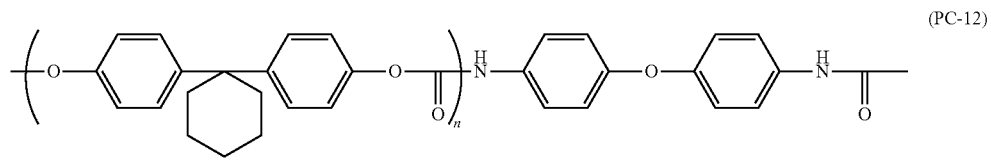

(PC-12)

$n=4.00$ $Ar^1/(Ar^1+Ar^3)=0.80$

Comparative Example 3

4,4'-Dibenzoyl oxychloride (6.66 g) and methylene chloride (236 mL) were charged into a reaction vessel equipped with a mechanical stirrer, a stirring blade, and a baffle board. PTBP (0.049 g) as a chain-end terminator was added to the mixture, and the contents were stirred so as to be sufficiently mixed. After a temperature in the reaction vessel had been cooled to 15° C., a total amount of a prepared bisphenol Z solution was added to the solution (bisphenol Z solution preparation method: 419 mL of a 0.2 N aqueous solution of sodium hydroxide (3.6 g of sodium hydroxide) were prepared and cooled to room temperature or less, and then 0.1 g of sodium hydrosulfite as an antioxidant and 5.97 g of bisphenol Z were added to and completely dissolved in the solution to prepare the bisphenol Z solution). While the mixture was stirred, 0.059 mL of an aqueous solution (7 vol %) of tributylbenzylammonium chloride was added to the mixture and the stirring was continued for 1 hour.

The resultant reaction mixture was diluted with 0.2 L of methylene chloride and 0.1 L of water and washed. A lower layer was separated and further washed with 0.1 L of water once, 0.1 L of 0.03 N hydrochloric acid once, and 0.1 L of water three times in the stated order. The resultant methylene chloride solution was dropped and charged into methanol under stirring, and the resultant reprecipitated product was filtered and dried to provide a PC copolymer (PC-13) having the following structure.

The PC-10 had a reduced viscosity [$\eta_{sp}/C$] of 1.10 dl/g, and it was confirmed from NMR that the PC copolymer was of a structure composed of the following repeating unit and composition.

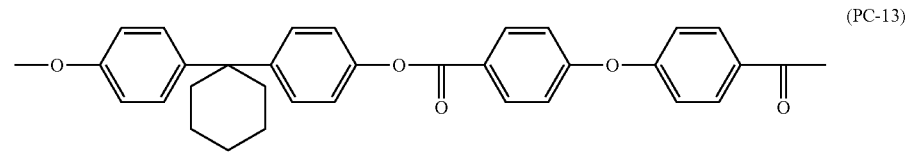

(PC-13)

$Ar^1/(Ar^1+Ar^3)=0.50$

TABLE 1

|  | PC copolymer | | | Electrophotographic photosensitive body | | |
|---|---|---|---|---|---|---|
|  |  |  |  |  | Residual potential | |
|  | Reduced viscosity (dl/g) | Abrasion resistance (mg) | Solubility | Abrasion resistance (mg) | Initial residual potential ($V_R$) | After repeated use ($V_R$ increase) |
| Example 1 (PC-1) | 1.12 | 0.22 | A | 0.41 | −10 | 10 |
| Example 2 (PC-2) | 1.10 | 0.24 | A | 0.43 | −10 | 10 |
| Example 3 (PC-3) | 1.13 | 0.26 | A | 0.50 | −10 | 10 |
| Example 4 (PC-4) | 1.10 | 0.28 | A | 0.45 | −10 | 10 |
| Example 5 (PC-5) | 1.12 | 0.27 | A | 0.50 | −10 | 10 |
| Example 6 (PC-6) | 1.09 | 0.28 | A | 0.44 | −10 | 10 |
| Example 7 (PC-7) | 1.11 | 0.23 | A | 0.44 | −10 | 10 |
| Example 8 (PC-8) | 1.08 | 0.25 | A | 0.48 | −10 | 10 |
| Example 9 (PC-9) | 1.10 | 0.27 | A | 0.47 | −10 | 10 |
| Example 10 (PC-10) | 1.09 | 0.27 | A | 0.42 | −10 | 10 |
| Example 11 (PC-11) | 1.10 | 0.24 | A | 0.44 | −10 | 10 |
| Comparative Example 1 (PC-11) | 1.14 | 0.40 | A | 0.61 | −10 | 10 |

TABLE 1-continued

| | PC copolymer | | | Electrophotographic photosensitive body | |
| | | | | | Residual potential |
| | Reduced viscosity (dl/g) | Abrasion resistance (mg) | Solubility | Abrasion resistance (mg) | Initial residual potential ($V_R$) | After repeated use ($V_R$ increase) |
|---|---|---|---|---|---|---|
| Comparative Example 2 (PC-12) | 1.15 | 0.44 | B | 0.59 | −30 | 30 |
| Comparative Example 3 (PC-13) | 1.11 | 0.43 | B | 0.65 | −20 | 20 |

Results of Evaluations

Table 1 shows the results of the evaluations of Examples 1 to 11 and Comparative Examples 1 to 3. Comparison between Examples 1 to 11 and Comparative Examples 1 to 3 confirmed that the PC copolymers of Examples 1 to 11 each had stable solubility in an organic solvent and extremely good abrasion resistance. Although the PC copolymers of Comparative Examples 1 to 3 were each found to have sufficiently good abrasion resistance, the PC copolymers of Examples 1 to 11 of the present invention were each found to have further high abrasion resistance. In addition, the electrophotographic photosensitive bodies of Examples 1 to 11 were found to be superior in all of abrasion resistance, electrical characteristics, and charging characteristics to those of Comparative Examples 1 to 3 because the electrophotographic photosensitive bodies of Examples 1 to 11 each had a small initial residual potential ($V_R$) and a small residual potential after repeated use ($V_R$ increase).

It was found that the electrophotographic photosensitive bodies of Comparative Examples 1 to 3 except Comparative Example 1 had bad electrical and charging characteristics because the electrophotographic photosensitive bodies each showed large values for both the initial residual potential and the residual potential after repeated use.

The electrophotographic photosensitive body of Comparative Example 2 showed a relatively small mass reduction amount in the abrasion resistance evaluation because the cohesive force of a urethane bond was high. However, it was found that the electrophotographic photosensitive body was poor in solution stability, and had bad electrical and charging characteristics because the electrophotographic photosensitive body showed large values for both the initial residual potential and the residual potential after repeated use.

In addition, the electrophotographic photosensitive body of Comparative Example 3 showed a relatively small mass reduction in the abrasion resistance evaluation because the electrophotographic photosensitive body contained many rigid ester bonds. However, it was found that the electrophotographic photosensitive body had bad solubility owing to the crystallization of the PC copolymer, and had bad electrical and charging characteristics because the electrophotographic photosensitive body showed values inferior in both the initial residual potential and the residual potential after repeated use to those of Examples.

INDUSTRIAL APPLICABILITY

The polycarbonate copolymer of the present invention can be suitably utilized as a binder resin for the photosensitive layer of an electrophotographic photosensitive body. In addition, the coating liquid of the present invention containing the copolymer is useful in the production of a molded body, various members each having a coat film, a cast film, and a coating film (such as a drum and a roll) because the coating liquid is excellent in adhesiveness with various substrates (a polyethylene terephthalate film and an aluminum substrate).

The invention claimed is:

1. A polycarbonate copolymer, comprising:
   a repeating unit A of formula (1);
   a repeating unit B of formula (2); and
   a repeating unit C of formula (3),
   wherein:
   the polycarbonate copolymer has
   a presence ratio represented by $Ar^1/(Ar^1+Ar^2+Ar^3)$ of from 50 to 65 mol %,
   a presence ratio represented by $Ar^2/(Ar^1+Ar^2+Ar^3)$ of from 25 to 45 mol %, and
   a presence ratio represented by $Ar^3/(Ar^1+Ar^2+Ar^3)$ of from 3 to 25 mol %; and
   the repeating units B are not directly bonded to each other:

(1)

(2)

(3)

wherein,
$Ar^1$, $Ar^2$, and $Ar^3$ are each independently a divalent aromatic group, and $X^1$ and $X^2$ are each independently a single bond or —NH—, with the proviso that $Ar^1$ and $Ar^2$ are not identical to each other.

2. The polycarbonate copolymer according to claim 1, wherein $Ar^1$ is of formula (4):

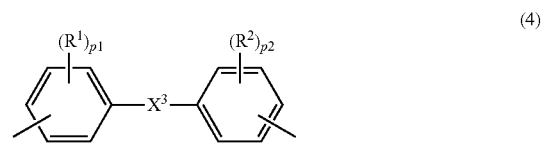

(4)

wherein $R^1$ and $R^2$ are each independently a halogen atom, an alkyl group having 1 to 12 carbon atoms, a haloalkyl group having 1 to 12 carbon atoms, an optionally substituted aryl group having 6 to 12 ring-forming carbon atoms, an optionally substituted alkoxy group having 1 to 12 carbon atoms, an optionally substituted aryloxy group having 6 to 12 ring-forming carbon atoms, or an optionally substituted arylalkyl group having 7 to 20 carbon atoms;

p1 and p2 are each independently an integer of from 0 to 4, wherein when p1 is an integer of 2 or more, a plurality of $R^1$ may be identical to or different from each other, and when p2 is an integer of 2 or more, a plurality of $R^2$ may be identical to or different from each other;

$X^3$ is a single bond, —O—, —CO—, —S—, —SO—, —SO$_2$—, —CR$^3$R$^4$—, an optionally substituted cycloalkylidene group having 5 to 20 carbon atoms, an optionally substituted bicyclo- or tricyclo-hydrocarbon-diyl group having 5 to 20 carbon atoms, an optionally substituted α,ω-alkylene group having 2 to 12 carbon atoms, an optionally substituted 9,9-fluorenylidene group, an optionally substituted 1,8-menthanediyl group, an optionally substituted 2,8-menthanediyl group, an optionally substituted arylene group having 6 to 12 ring-forming carbon atoms, any one of divalent groups of formulae (5), or an alkylidene-arylene-alkylidene group having 8 to 16 carbon atoms of formula (6); and $R^3$ and $R^4$ are each independently a hydrogen atom, an alkyl group having 1 to 12 carbon atoms, a haloalkyl group having 1 to 12 carbon atoms, or an optionally substituted aryl group having 6 to 12 ring-forming carbon atoms:

(5)

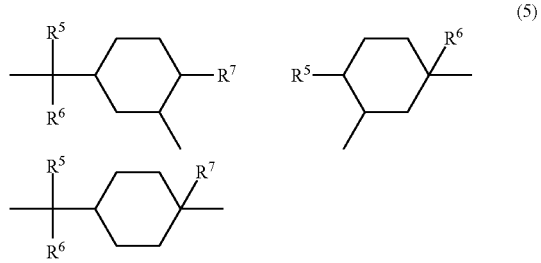

wherein, $R^5$ to $R^7$ are each independently a halogen atom, an alkyl group having 1 to 12 carbon atoms, a haloalkyl group having 1 to 12 carbon atoms, an optionally substituted aryl group having 6 to 12 ring-forming carbon atoms, an optionally substituted alkoxy group having 1 to 12 carbon atoms, an optionally substituted aryloxy group having 6 to 12 ring-forming carbon atoms, or an optionally substituted arylalkyl group having 7 to 20 carbon atoms;

(6)

wherein, $R^8$ to $R^{11}$ are each independently a halogen atom, an alkyl group having 1 to 12 carbon atoms, a haloalkyl group having 1 to 12 carbon atoms, an optionally substituted aryl group having 6 to 12 ring-forming carbon atoms, an optionally substituted alkoxy group having 1 to 12 carbon atoms, an optionally substituted aryloxy group having 6 to 12 ring-forming carbon atoms, or an optionally substituted arylalkyl group having 7 to 20 carbon atoms.

3. The polycarbonate copolymer according to claim 1, wherein $Ar^2$ and $Ar^3$ are each independently an optionally substituted naphthylene group or a divalent group of formula (7):

(7)

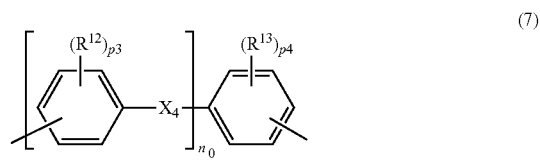

wherein $X_4$ is a single bond, —O—, —CO—, —S—, —SO—, —SO$_2$—, —CONH—, —CR$^6$R$^7$—, —O—R$^8$—O—, an optionally substituted cycloalkylidene group having 5 to 20 carbon atoms, an optionally substituted bicyclo- or tricyclo-hydrocarbon-diyl group having 5 to 20 carbon atoms, an optionally substituted αm-alkylene group having 2 to 12 carbon atoms, an optionally substituted 9,9-fluorenylidene group, an optionally substituted 1,8-menthanediyl group, an optionally substituted 2,8-menthanediyl group, an optionally substituted pyrazylidene group, an optionally substituted arylene group having 6 to 12 ring-forming carbon atoms, any one of divalent groups of formulae (5), or an alkylidene-arylene-alkylidene group having 8 to 16 carbon atoms of formula (6);

$R^6$ and $R^7$ are each independently a hydrogen atom, an alkyl group having 1 to 12 carbon atoms, a haloalkyl group having 1 to 12 carbon atoms, or an optionally substituted aryl group having 6 to 12 ring-forming carbon atoms;

$R^8$ is at least one of a carbonyl group, an alkylene group having 1 to 6 carbon atoms, a haloalkylene group having 1 to 6 carbon atoms and an arylene group having 6 to 12 ring-forming carbon atoms;

$R^{12}$ and $R^{13}$ are each independently a halogen atom, an alkyl group having 1 to 12 carbon atoms, a haloalkyl group having 1 to 12 carbon atoms, an optionally substituted aryl group having 6 to 12 ring-forming carbon atoms, an optionally substituted alkoxy group having 1 to 12 carbon atoms, an optionally substituted aryloxy group having 6 to 12 ring-forming carbon atoms, or an optionally substituted arylalkyl group having 7 to 20 carbon atoms;

p3 and p4 are each independently an integer of from 0 to 4, wherein when p3 is an integer of 2 or more, a plurality of $R^{12}$ may be identical to or different from each other, and when p4 is an integer of 2 or more, a plurality of $R^{13}$ may be identical to or different from each other; and $n_0$ is an integer of from 0 to 2, and when $n_0$ is 2, a plurality of $R^{12}$ may be identical to or different from each other, a plurality of p3 may be identical to or different from each other, and a plurality of $X_4$ may be identical to or different from each other:

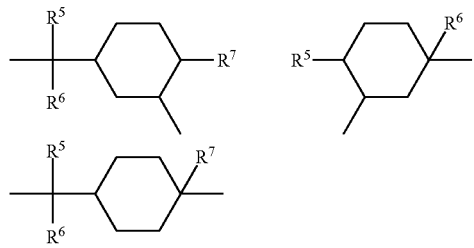
(5)

wherein
$R^5$ to $R^7$ are each independently a halogen atom, an alkyl group having 1 to 12 carbon atoms, a haloalkyl group having 1 to 12 carbon atoms, an optionally substituted aryl group having 6 to 12 ring-forming carbon atoms, an optionally substituted alkoxy group having 1 to 12 carbon atoms, an optionally substituted aryloxy group having 6 to 12 ring-forming carbon atoms, or an optionally substituted arylalkyl group having 7 to 20 carbon atoms

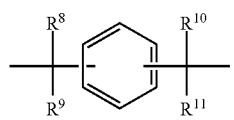
(6)

wherein
$R^8$ to $R^{11}$ are each independently a halogen atom, an alkyl group having 1 to 12 carbon atoms, a haloalkyl group having 1 to 12 carbon atoms, an optionally substituted aryl group having 6 to 12 ring-forming carbon atoms, an optionally substituted alkoxy group having 1 to 12 carbon atoms, an optionally substituted aryloxy group having 6 to 12 ring-forming carbon atoms, or an optionally substituted arylalkyl group having 7 to 20 carbon atoms.

4. The polycarbonate copolymer according to claim 2, wherein $X^3$ in the formula (4) is —$CR^3R^4$—, an optionally substituted cycloalkylidene group having 5 to 20 carbon atoms, or an optionally substituted bicyclo- or tricyclo-hydrocarbon-diyl group having 5 to 20 carbon atoms, and $R^3$ and $R^4$ are each independently a hydrogen atom or an alkyl group having 1 to 12 carbon atoms.

5. The polycarbonate copolymer according to claim 1, wherein the $Ar^1$ is any one of the following formulae:

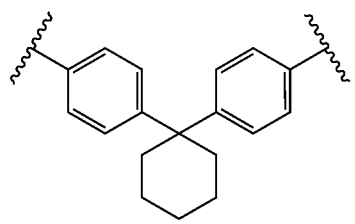

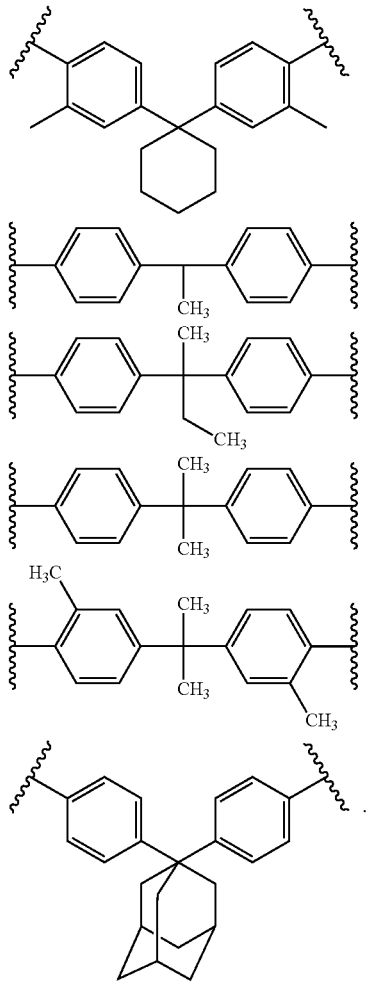

6. A method of producing the polycarbonate copolymer according to claim 1, comprising:
reacting a bischloroformate oligomer of formula (I), a dihydric phenol compound of formula (II), a diamine compound of formula (III-1) and/or an acid chloride of formula (III-2), and an acid-binding agent with one another:

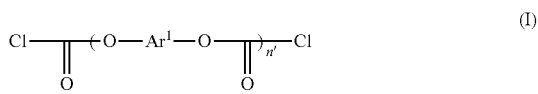
(I)

(II)

(III-1)

(III-2)

wherein
$Ar^1$, $Ar^2$, and $Ar^3$ are each independently a divalent aromatic group, and n' is an average repeating number of monomer unit and is from 1.0 to 1.99, with the proviso that $Ar^1$ and $Ar^2$ are not identical to each other.

7. The method of producing a polycarbonate copolymer according to claim 6, further comprising:

reacting the bischloroformate oligomer, and the diamine compound and/or the acid chloride with each other to form a first reaction product, and then reacting the first reaction product with the dihydric phenol.

8. The method of producing a polycarbonate copolymer according to claim 6, wherein a base amount of the acid-binding agent is from 1.1 to 3.0 molar equivalents per mol of the bischloroformate oligomer.

9. The method of producing a polycarbonate copolymer according to claim 6, further comprising adding a chain-end terminator.

10. A coating liquid, comprising:
the polycarbonate copolymer according to claim 1; and
an organic solvent.

11. An electrophotographic photosensitive body, comprising:
a conductive substrate; and
a photosensitive layer formed on the conductive substrate, wherein the photosensitive layer comprises the polycarbonate copolymer according to claim 1.

12. The polycarbonate copolymer according to claim 2, wherein $X^3$ is —$CR^3R^4$—, an optionally substituted cycloalkylidene group having 5 to 20 carbon atoms, an optionally substituted bicyclo- or tricyclo-hydrocarbon-diyl group having 5 to 20 carbon atoms or an optionally substituted α,ω-alkylene group having 2 to 12 carbon atoms.

13. The polycarbonate copolymer according to claim 2, wherein $X^3$ is a single bond or —O—.

14. The polycarbonate copolymer according to claim 1, wherein an average repeating number in the repeating unit A of formula (1) is from 1.0 to 3.0.

15. The polycarbonate copolymer according to claim 1, wherein the presence ratio $Ar^1/(Ar^1+Ar^2+Ar^3)$ is from 52 to 65 mol %.

16. The polycarbonate copolymer according to claim 1, wherein the presence ratio $Ar^2/(Ar^1+Ar^2+Ar^3)$ is from 30 to 45 mol %.

17. The polycarbonate copolymer according to claim 1, wherein a reduced viscosity $[\eta_{SP}/C]$ at 20° C. of a solution of the polycarbonate copolymer in methyl chloride having a concentration of 0.5 g/dl, is from 0.5 to 4 dl/g.

18. The polycarbonate copolymer according to claim 2, wherein $X^3$ is an optionally substituted cycloalkylidene group having 5 to 20 carbon atoms, an optionally substituted bicyclo- or tricyclo-hydrocarbon-diyl group having 5 to 20 carbon atoms, an optionally substituted 9,9-fluorenylidene group, an optionally substituted 1,8-menthanediyl group, an optionally substituted 2,8-menthanediyl group, or an optionally substituted arylene group having 6 to 12 ring-forming carbon atoms, and wherein the optional substituents are an alkyl group having 1 to 6 carbon atoms.

19. The polycarbonate copolymer according to claim 3, wherein $X_4$ is a single bond, —O—, —S—, —SO—, —$SO_2$—, —CONH—, —$CR^6R^7$—, —O—$R^8$—O—, an optionally substituted cycloalkylidene group having 5 to 20 carbon atoms, an optionally substituted bicyclo- or tricyclo-hydrocarbon-diyl group having 5 to 20 carbon atoms, an optionally substituted α,ω-alkylene group having 2 to 12 carbon atoms, an optionally substituted 9,9-fluorenylidene group, an optionally substituted 1,8-menthanediyl group, an optionally substituted 2,8-menthanediyl group, an optionally substituted pyrazylidene group, or an optionally substituted arylene group having 6 to 12 ring-forming carbon atoms.

20. The polycarbonate copolymer according to claim 3, wherein $X_4$ is a single bond or —O—.

\* \* \* \* \*